(12) United States Patent
Kim et al.

(10) Patent No.: US 10,679,053 B2
(45) Date of Patent: Jun. 9, 2020

(54) METHOD AND DEVICE FOR RECOGNIZING BIOMETRIC INFORMATION

(71) Applicant: Samsung Electronics Co., Ltd., Gyeonggi-do (KR)

(72) Inventors: Moon-Soo Kim, Seoul (KR); Kwang-Sub Son, Gyeonggi-do (KR); Ki-Huk Lee, Gyeonggi-do (KR); Bo-Seul Jeon, Gyeonggi-do (KR); Young-Eun Han, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/377,475

(22) Filed: Apr. 8, 2019

(65) Prior Publication Data

US 2019/0266400 A1   Aug. 29, 2019

Related U.S. Application Data

(63) Continuation of application No. 15/324,861, filed as application No. PCT/KR2014/006174 on Jul. 9, 2014, now Pat. No. 10,255,498.

(51) Int. Cl.
*G06K 9/00* (2006.01)
*G06K 9/62* (2006.01)
*H04N 5/232* (2006.01)

(52) U.S. Cl.
CPC ......... *G06K 9/00604* (2013.01); *G06K 9/00* (2013.01); *G06K 9/00885* (2013.01); *G06K 9/62* (2013.01); *H04N 5/23216* (2013.01); *H04N 5/23219* (2013.01); *G06K 9/00597* (2013.01)

(58) Field of Classification Search
CPC ........... G06K 9/00597; G06K 9/00604; G06K 9/00885; G06K 9/00087; G06K 9/62; H04N 5/23216; H04N 5/23219; G06F 21/31; G06F 21/316; G06F 3/013
USPC ........................................................ 382/117
See application file for complete search history.

(56) References Cited

U.S. PATENT DOCUMENTS

| | | | |
|---|---|---|---|
| 7,155,035 B2 | 12/2006 | Kondo et al. | |
| 8,223,024 B1* | 7/2012 | Petrou ................. | G02B 27/017 340/573.1 |
| 10,423,772 B2* | 9/2019 | Dass .................. | G06K 9/00617 |
| 2004/0160518 A1 | 8/2004 | Park | |
| 2006/0078176 A1 | 4/2006 | Abiko et al. | |

(Continued)

FOREIGN PATENT DOCUMENTS

| | | |
|---|---|---|
| EP | 0 973 122 B1 | 3/2008 |
| EP | 3087533 A4 | 9/2017 |

(Continued)

OTHER PUBLICATIONS

Chien-Cheng Lin et al. "A New Non-Intrusive Authentication Method based on the Orientation Sensor for Smartphone Users," 2012, pp. 245-252.

*Primary Examiner* — Ali Bayat
(74) *Attorney, Agent, or Firm* — Cha & Reiter, LLC.

(57) ABSTRACT

Disclosed is a method by which an electronic device recognizes biometric information, comprising the steps of: sensing a direction of an electronic device; and recognizing biometric information by using a parameter corresponding to the sensed direction.

21 Claims, 16 Drawing Sheets

(56) References Cited

U.S. PATENT DOCUMENTS

| | | | |
|---|---|---|---|
| 2008/0044063 A1* | 2/2008 | Friedman | A61B 3/1216 382/117 |
| 2008/0181467 A1 | 7/2008 | Zappia | |
| 2010/0045933 A1 | 2/2010 | Eberl et al. | |
| 2013/0162799 A1 | 6/2013 | Hanna et al. | |
| 2013/0169683 A1* | 7/2013 | Perez | G02B 27/02 345/633 |
| 2013/0182915 A1* | 7/2013 | Hanna | G06T 7/521 382/116 |
| 2013/0227678 A1 | 8/2013 | Kang et al. | |
| 2014/0197922 A1* | 7/2014 | Stanwood | G06F 21/32 340/5.83 |
| 2015/0002392 A1* | 1/2015 | Kempinski | A61B 3/113 345/156 |
| 2016/0042221 A1 | 2/2016 | Mei et al. | |
| 2016/0262608 A1 | 9/2016 | Krueger | |

FOREIGN PATENT DOCUMENTS

| | | |
|---|---|---|
| KR | 10-2005-0009959 A | 1/2005 |
| KR | 10-0634666 B1 | 10/2006 |
| KR | 10-0673427 B1 | 1/2007 |
| KR | 10-0954640 B1 | 4/2010 |
| KR | 10-1163772 B1 | 7/2012 |
| WO | 2008/131201 A1 | 10/2008 |
| WO | 2012/086966 A2 | 6/2012 |

\* cited by examiner 805  807  809

METHOD AND DEVICE FOR RECOGNIZING BIOMETRIC INFORMATION

CROSS REFERENCE TO RELATED APPLICATIONS

This application is a Continuation of U.S. patent application Ser. No. 15/324,861 filed on Jan. 9, 2017 which claims priority of National Phase Entry of PCT International Application No. PCT/KR2014/006174, which was filed on Jul. 9, 2014, the contents of which are incorporated herein by reference.

TECHNICAL FIELD

The present disclosure relates to a method and apparatus for recognizing biometric information. For example, the present disclosure relates to an electronic device and a method for recognizing an iris using a camera.

BACKGROUND ART

Recently, various functions, such as mp3, games, a camera function, or the like, have been added to electronic devices, and the electronic devices have been capable of performing a function that requires security, such as a car key, purchasing products, Internet banking or the like. Accordingly, security technologies using various types of biometric information have been applied to electronic devices, such as fingerprint, voice, iris, face, and vein information, which are biometric features humans.

An iris includes a unique pattern formed within 1 to 2 years after birth, and is never changed. The iris of a living person has a fine tremor and thus, it is impossible to steal the iris of another person.

Iris recognition identifies a person through a process of changing the wrinkles of an iris into a frequency, and an electronic device to which the iris recognition is applied may use a camera technique and infrared light to store an iris image.

DETAILED DESCRIPTION OF THE INVENTION

Technical Problem

However, in the case of an iris recognition system according to the technologies up to date, a recognition rate in association with recognizing an iris according to a photographing direction of an electronic device is low, which is a drawback. Also, when the electronic device recognizes an iris, the iris of a user needs to be placed at a location from which an iris recognition camera can recognize, which is a drawback.

Various embodiments of the present disclosure provide a method and apparatus through which an electronic device obtains biometric information of a user.

Technical Solution

In accordance with an aspect of the present disclosure, there is provided a method of recognizing biometric information by an electronic device, the method including: sensing an orientation of an electronic device; and recognizing biometric information using a parameter corresponding to the sensed orientation.

In accordance with another aspect of the present disclosure, there is provided a method of recognizing iris information by an electronic device, the method including: sensing whether an orientation of an electronic device is a first direction or a second direction; recognizing first iris information using a parameter, including at least one of the length, intensity, and period of an infrared light emission pulse and the sensitivity of an image sensor, based on the sensed first direction, mapping the recognized first iris information and the first direction, and storing the information; controlling the parameter when the electronic device moves to the second direction; and recognizing second iris information using the controlled parameter, mapping the recognized second iris information and the second direction, and storing the information.

In accordance with an aspect of the present disclosure, there is provided an electronic device that recognizes biometric information, the electronic device including: a processor that senses an orientation of the electronic device; and a biometric information recognizing module for recognizing biometric information using a parameter corresponding to the sensed orientation.

In accordance with another aspect of the present disclosure, there is provided an electronic device that recognizes iris information, the electronic device including: a biometric information recognizing module that senses whether an orientation of the electronic device is a first direction or a second direction; and a processor that performs a control to: recognize first iris information using a parameter, including at least one of the length, intensity, and period of an infrared light emission pulse and the sensitivity of an image sensor, based on the sensed first direction; map the recognized first iris information and the first direction; and store the information in a memory, and performs a control to: control the parameter when the electronic device moves to the second direction; recognize second iris information using the controlled parameter, map the recognized second iris information and the second direction; and store the information in the memory.

Advantageous Effects

According to the disclosure of the present disclosure, biometric information of a user may be recognized irrespective of an orientation of an electronic device.

Also, according to the disclosure of the present disclosure, security in association with the iris of a user may be secured.

Also, according to the disclosure of the present disclosure, a biometric information recognition rate of a user may be increased when an electronic device performs an authentication procedure using biometric information.

MODE FOR CARRYING OUT THE INVENTION

Figure 1:
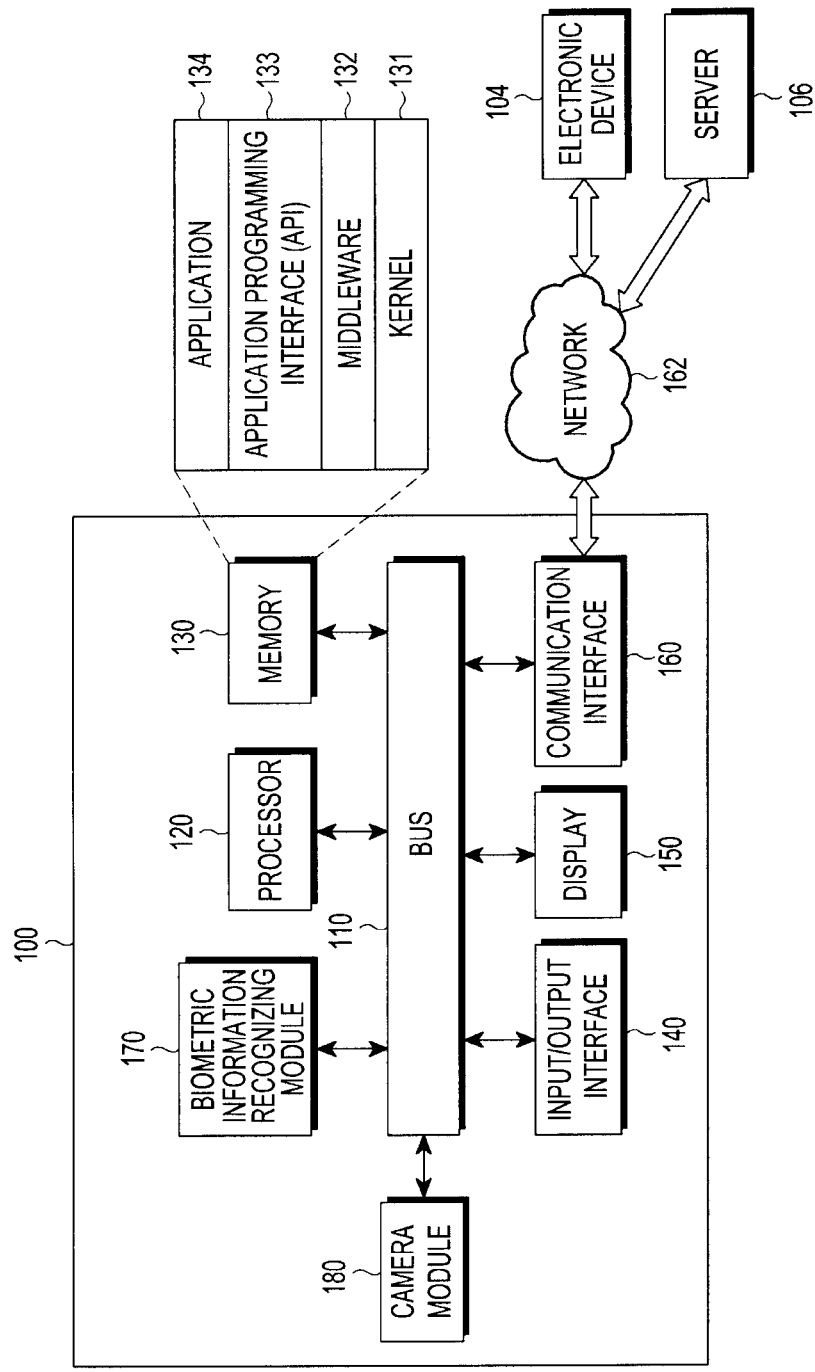
FIG. 1 is a diagram illustrating a network environment including an electronic device according to various embodiments of the present disclosure.

Hereinafter, the present disclosure will be described with reference to the accompanying drawings. The present disclosure may have various modifications and embodiments and thus will be described in detail with reference to specific embodiments illustrated in the drawings. However, it should be understood that there is no intent to limit the present disclosure to the particular forms disclosed herein; rather, the present disclosure should be construed to cover all modifications, equivalents, and/or alternatives falling within the spirit and scope of the disclosure. In connection with descriptions of the drawings, like reference numerals designate like elements.

In the present disclosure, the expression "include" or "may include" refers to existence of a corresponding function, operation, or element, and does not limit one or more additional functions, operations, or elements. In the present disclosure, the terms such as "include" and/or "have" may be construed to denote a certain characteristic, number, step, operation, constituent element, element or a combination thereof, but may not be construed to exclude the existence of or a possibility of addition of one or more other characteristics, numbers, steps, operations, constituent elements, elements or combinations thereof.

In the present disclosure, the expression "or" includes any or all combinations of words enumerated together. For example, the expression "A or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element could be termed a second element, and similarly, a second element could be also termed a first element without departing from the scope of the present disclosure.

In the case where an element is referred to as being "connected" or "accessed" to other elements, it should be understood that not only the element is directly connected or accessed to the other elements, but also another element may exist between them. Contrarily, when an element is referred to as being "directly coupled" or "directly connected" to any other element, it should be understood that no element is interposed therebetween.

The terms used in the present disclosure are only used to describe specific embodiments, and are not intended to limit the present disclosure. As used herein, the singular forms are intended to include the plural forms as well, unless the context clearly indicates otherwise.

Unless defined otherwise, all terms used herein, including technical and scientific terms, have the same meaning as commonly understood by those of skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to the present disclosure may be a device including a function of recognizing biometric information. As an example, the biometric information may be iris information. For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch.

According to some embodiments, the electronic device may be a smart home appliance with a function of recognizing biometric information. The smart home appliance, for example, may include at least one of a television, a digital video disk (DVD) player, an audio player, a refrigerator, an air conditioners, a cleaner, an oven, a microwave oven, a washing machine, an air purifier, a set-top box, a TV box, a game console, an electronic dictionary, an electronic key, a camcorder, and an electronic frame.

According to some embodiments, the electronic device may include at least one of various types of medical devices (for example, Magnetic Resonance Angiography (MRA), Magnetic Resonance Imaging (MRI), Computed Tomography (CT), a scanning machine, ultrasonic wave device and the like), a navigation device, a Global Positioning System (GPS) receiver, an Event Data Recorder (EDR), a Flight Data Recorder (FDR), a car infotainment device, ship electronic equipment (for example, navigation equipment for a ship, a gyro compass and the like), avionics, a security device, and an industrial or home robot.

According to some embodiments, the electronic device may include at least one of a part of furniture or a building/structure including a function of recognizing biometric information, an electronic board, an electronic signature receiving device, a projector, and various kinds of measuring instruments (e.g., a water meter, an electric meter, a gas meter, a radio wave meter, and the like). The electronic device according to the present disclosure may be a combination of one or more of the aforementioned various devices. Further, it is obvious to those skilled in the art that the electronic device according to the present disclosure is not limited to the aforementioned devices.

Hereinafter, an electronic device according to various embodiments will be described with reference to the accompanying drawings. The term "user" used in various embodiments may refer to a person who uses an electronic device or a device (for example, an artificial intelligence electronic device) that uses an electronic device.

Although embodiments describe a method of recognizing biometric information (iris information) by an electronic device and a method of executing a security process using the recognized biometric information, the following embodiments may be applied similarly to a method of recognizing a different type of biometric information (fingerprint information or vein information) and a method of executing a security process using the recognized biometric information. For example, even when an image including fingerprint information or an image including vein map information is displayed in a display, or is used for a recognition procedure, the fingerprint information or the vein map information may be recognized and a security process may be executed using the recognized information through a process similar to the following embodiments.

FIG. 1 illustrates a network environment including an electronic device according to various embodiments of the present disclosure.

Referring to FIG. 1, an electronic device 100 may include a bus 110, a processor 120, a memory 130, an input/output interface 140, a display 150, a communication interface 160, a biometric information recognizing module 170, and a camera module 180.

The bus 110 may be a circuit that interconnects the above-described elements and delivers communications (e.g., a control message) between the above-described elements.

The memory 130 may store a command or data received from the processor 120 or other elements (e.g., the input/output interface 140, the display 150, the communication interface 160, the biometric information recognizing module 170, the camera module 180, or the like), or may store a command or data generated by the processor 120 or other component elements. The memory 130 may include programming modules, for example, a kernel 131, a middleware 132, an application programming interface (API) 133, an application 134, or the like. Each of the aforementioned programming modules may be formed of software, firmware, hardware, or a combination of at least two thereof.

The kernel 131 may control or manage system resources (e.g., the bus 110, the processor 120, the memory 130, and the like) that are used to execute operations or functions implemented in the other programming modules, for example, the middleware 132, the API 133, and the applications 134. In addition, the kernel 131 may provide an interface that enables the middleware 132, the API 133, or the applications 134 to access individual elements of the electronic device 100 for control or management thereof.

The middleware 132 may serve as a relay for allowing the API 133 or the applications 134 to transmit/receive data to/from the kernel 131 through communication therewith. Furthermore, in regard to task requests received from the applications 134, the middleware 132 may perform a control (e.g., scheduling or load balancing) for the task requests by using a method of assigning, to at least one of the applications 134, a priority for using the system resources (e.g., the bus 110, the processor 120, the memory 130, or the like) of the electronic device 100.

The API 133 is an interface through which the applications 134 control functions provided by the kernel 131 or the middleware 132, and may include at least one interface or function (e.g., instruction) for file control, window control, image processing, or text control.

According to various embodiments of the present disclosure, the application 134 may include an iris recognition application, a short message service (SMS)/multimedia messaging service (MMS) application, an email application, a calendar application, an alarm application, a health care application (e.g., an application measuring a quantity of exercise or blood sugar), an environmental information application (e.g., an application providing information associated with pressure, humidity, temperature, or the like), or the like. Additionally or alternatively, the applications 134 may include an application related to the exchanging of information between the electronic device 100 and an external electronic device (e.g., an electronic device 104). The application related to exchanging information may include, for example, a notification relay application for transferring predetermined information to an external electronic device or a device management application for managing an external electronic device.

For example, the notification relay application may include a function of transferring, to the external electronic device (e.g., the electronic device 104), notification information generated from other applications of the electronic device 100 (e.g., an SMS/MMS application, an e-mail application, a health management application, an environmental information application, and the like). Additionally or alternatively, the notification relay application may, for example, receive notification information from an external electronic device (e.g. the electronic device 104), and may provide the notification information to a user. The device management application may manage (e.g., install, delete, or update), for example, a function of at least a part of an external electronic device (e.g., the electronic device 104) that communicates with the electronic device 100 (e.g., turning on/off the external electronic device (or a few components) or adjusting brightness (or resolution) of a display, an application operated in the external electronic device, or a service provided from the external electronic device (e.g. a call service or a message service).

According to various embodiments, the application 134 may include an application designated according to properties (e.g., a type of electronic device) of an external electronic device (e.g., the electronic device 104). For example, in a case where the external electronic device is an MP3 player, the application 134 may include an application related to the reproduction of music. Similarly, in a case where the external electronic device is a mobile medical appliance, the application 134 may include an application related to health care. According to an embodiment, the application 134 may include at least one out of: an application designated to the electronic device 100 and an application received from an external electronic device (e.g. a server 106 or the electronic device 104).

According to an embodiment of the present disclosure, the memory 130 may store an image obtained in a biometric information recognition process according to an embodiment. The memory 130 may store iris information that a user registers for iris recognition, may map information associated with the orientation of the electronic device 100 and biometric information recognized by the electronic device 100, and may store the same. For example, when biometric information that is recognized when the electronic device 100 is oriented to the horizontal direction is iris information, the memory 130 may map the horizontal direction and the recognized iris information and store the same. Also, the memory 130 may store information associated with a parameter set according to the orientation of the electronic device 100. For example, the parameter may include information associated with the length, intensity, and period of an infrared light emission pulse and the sensitivity of an image sensor included in a camera module. Also, the memory 130 may store a parameter corresponding to each orientation of the electronic device 100, for example, a parameter corresponding to the horizontal direction when the electronic device 100 is oriented to the horizontal direction, and a parameter corresponding to the vertical direction when the electronic device 100 is oriented to the vertical direction. Also, the memory 130 may store biometric information sensed by the electronic device 100 and an identifier associated with the biometric information, and may provide information to enable the processor 120 to identify a user using the identifier and biometric information corresponding thereto.

The input/output interface 140 may transfer a command or data input by a user through an input/output device (e.g., a sensor, a keyboard, or a touch screen), to the processor 120, the memory 130, the communication interface 160, and the biometric information recognizing module 170, through, for example, the bus 110. For example, the input/output interface 140 may provide, to the processor 120, data associated with a touch of a user input through a touch screen. Further, the input/output interface 140 may output a command or data received through the bus 110 from the processor 120, the memory 130, the communication interface 160, and the biometric information recognizing module 170, through an input/output device (e.g., a speaker or display). For example, the input/output interface 140 may output audio data processed through the processor 120 to a user through a speaker.

The display 150 may display various pieces of information (e.g., multimedia data, text data, and the like) and images to a user.

The communication interface 160 may connect communication between the electronic device 100 and an external electronic device (e.g., the electronic device 104 or the server 106). For example, the communication interface 160 may be connected to the network 162 through wireless communication or wired communication, and may communicate with an external device. The wireless communication may include at least one of, for example, Wi-Fi, Bluetooth (BT), near field communication (NFC), a global positioning system (GPS), and cellular communication (e.g. LTE, LTE-A, CDMA, WCDMA, UMTS, WiBro, GSM, or the like). The wired communication may include at least one of, for example, a universal serial bus (USB), a high definition multimedia interface (HDMI), recommended standard 232 (RS-232), and a plain old telephone service (POTS).

The camera module 180 may include an image sensor according to an embodiment, may process a biometric image obtained for biometric information recognition by using the processor 120 or independently from the processor 120, and may display the biometric image in the display 150. The biometric information may include, for example, iris information. As another example, the camera module 180 may set an iris recognition mode, may generate an image of a subject (that is, an image obtained by photographing the face of a user) by controlling the image sensor, and may recognize an image area including at least a portion of an iris (that is, an iris area) from the generated image. The camera module 180 may determine guide information corresponding to the recognized iris area according to another embodiment, and may provide the determined guide information to a user. The guide information may include information that guides a user to an appropriate location of an iris in an image used for the iris recognition. Also, the camera module 180 may generate an image including image effects by applying an appropriate image effect to a recognized iris area, and may display the image in a display. The image effect may be image processing that enables only the shape of the detected iris area to be identified. According to an embodiment, the electronic device may further include the biometric information recognizing module 170, or the biometric information recognizing module 170 may include the camera module 180.

The biometric information recognizing module 170 may process at least some pieces of information acquired from the other elements (e.g., the processor 120, the memory 130, the input/output interface 140, or the communication interface 160, the camera module 180, or the like), and may provide the processed information to a user through various methods.

According to an embodiment of the present disclosure, the biometric information recognizing module 170 may sense the orientation of the electronic device by using the processor 120 or independently from the processor 120, and may recognize biometric information using a parameter corresponding to the sensed orientation. Also, the biometric information recognizing module 170 may control a parameter, and the parameter may include at least one out of: the length, intensity, and period of an infrared light emission pulse and the sensitivity of an image sensor.

For example, when the electronic device 100 is oriented to the horizontal direction, the biometric information recognizing module 170 may control the length of an infrared light emission pulse corresponding to the horizontal direction to be longer than the length of an infrared light emission pulse corresponding to the vertical direction, and may control the intensity of the infrared light emission pulse corresponding to the horizontal direction to be lower than the intensity of the infrared light emission pulse corresponding to the vertical direction, so as to control the parameter. Also, when the electronic device 100 is oriented to the horizontal direction, the biometric information recognizing module 170 may control a sensitivity of an image sensor corresponding to the horizontal direction to be higher than a sensitivity of an image sensor corresponding to the vertical direction.

As another example, when the electronic device 100 is oriented to the vertical direction, the biometric information recognizing module 170 may control the length of an infrared light emission pulse corresponding to the vertical direction to be shorter than the length of an infrared light emission pulse corresponding to the horizontal direction, and may control the intensity of the infrared light emission pulse corresponding to the vertical direction to be higher than the intensity of the infrared light emission pulse corresponding to the horizontal direction, so as to control the parameter. Also, when the electronic device 100 is oriented to the vertical direction, the biometric information recognizing module 170 may control a sensitivity of an image sensor corresponding to the vertical direction to be lower than a sensitivity of an image sensor corresponding to the horizontal direction.

As another example, the biometric information recognizing module 170 may sense the orientation of the electronic device, and may recognize biometric information using a parameter corresponding to the sensed orientation. The biometric information recognizing module 170 may map information associated with the sensed orientation of the electronic device and the recognized biometric information, and may store the same. When the electronic device 100 displays a screen that requests biometric information of a user, which is required for executing at least one function, the biometric information recognizing module 170 may perform: recognizing the biometric information through the displayed screen; recognizing the orientation of the electronic device 100 and reading out biometric information mapped to the recognized orientation when the screen is displayed; comparing the recognized biometric information and the read biometric information; and controlling the processor 120 and the elements of the electronic device 100 to execute the function.

As another example, when a recognition rate with respect to the recognized biometric information is less than or equal to a threshold value, the biometric information recognizing module 170 may perform a control to: output a message that requests changing the orientation of the electronic device 100; re-recognize biometric information in the changed orientation; and combine the recognized biometric information and the re-recognized biometric information and store the same in the memory 130. The recognition rate may include information associated with a ratio of an area that the electronic device 100 is capable of recognizing from a photographed iris to the entire area of the recognized biometric information.

Also, the biometric information recognizing module 170 may include at least one out of: an acceleration sensor, an image sensor, an angular speed sensor, and a gravity sensor, and may sense the orientation of the electronic device 100 using the at least one sensor. For example, accordingly, whether the electronic device 100 is oriented to the horizontal direction or the vertical direction may be sensed.

Also, according to an embodiment of the present disclosure, the biometric information recognizing module 170 may sense whether the orientation of the electronic device is a first direction or a second direction, may recognize first iris information using a parameter, which includes at least one of the length, intensity, and period of an infrared light emission pulse and the sensitivity of an image sensor, based on the sensed first direction, and may map the recognized first iris information and the first direction and store the same. When the electronic device moves to the second direction, the biometric information recognizing module 170 may control the parameter, may recognize second iris information using the controlled parameter, may map the recognized second iris information and the second direction, and may store the same. The biometric information recognizing module 170 may display a screen that requests iris information of a user, which is required for executing at least one function of the electronic device, and may recognize the iris information through the displayed screen. When the screen is displayed, the biometric information recognizing module 170 may recognize the orientation of the electronic device, may read out iris information mapped to the recognized orientation, and may compare the recognized iris information and the read iris information. When the read iris information and the recognized iris information are identical to each other, the biometric information recognizing module 170 may control the processor 120 and the application 134 to execute at least one function of the electronic device.

For example, when the electronic device is oriented to the first direction, the biometric information recognizing module 170 may control the length of an infrared light emission pulse corresponding to the first direction to be longer than the length of an infrared light emission pulse corresponding to the second direction, and may control the intensity of the infrared light emission pulse corresponding to the first direction to be lower than the intensity of the infrared light emission pulse corresponding to the second direction, so as to control the parameter. When the electronic device is oriented to the first direction, the biometric information recognizing module 170 may control a sensitivity of an image sensor corresponding to the first direction to be higher than a sensitivity of an image sensor corresponding to the second direction, so as to control the parameter.

As another example, when the electronic device is oriented to the second direction, the biometric information recognizing module 170 may control the length of an infrared light emission pulse corresponding to the second direction to be shorter than the length of an infrared light emission pulse corresponding to the first direction, and may control the intensity of the infrared light emission pulse corresponding to the second direction to be higher than the intensity of the infrared light emission pulse corresponding to the first direction, so as to control the parameter. When the electronic device is oriented to the second direction, the biometric information recognizing module 170 may control a sensitivity of an image sensor corresponding to the second direction to be lower than a sensitivity of an image sensor corresponding to the first direction, so as to control the parameter. Also, the parameter may be set in advance to correspond to the recognized orientation.

The processor 120, for example, may receive a command from other component elements (e.g., the memory 130, the input/output interface 140, the display 150, the communication interface 160, the biometric information recognizing module 170, or the like), through the bus 110, may decrypt the received command, and may execute operation or data processing based on the decrypted command.

According to an embodiment of the present disclosure, the processor 120 may include the biometric information recognizing module 170, or may perform operations of the biometric information recognizing module 170 when the electronic device does not include the biometric information recognizing module 170.

According to an embodiment, the network 162 may be a communication network. The communication network may include at least one of a computer network, the Internet, the Internet of things, and a telephone network. According to an embodiment, a protocol (e.g., a transport layer protocol, data link layer protocol, or a physical layer protocol) for communication between the electronic device 100 and an external device may be supported by at least one of the applications 134, the application programming interface 133, the middleware 132, the kernel 131, and the communication interface 160.

Figure 2:
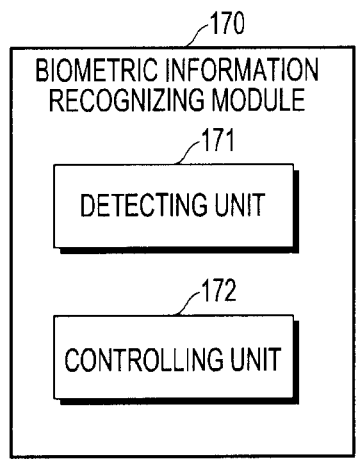
FIG. 2 is a diagram illustrating a configuration of a biometric information recognizing module according to various embodiments of the present disclosure.

FIG. 2 is a diagram illustrating a configuration of a biometric information recognizing module according to various embodiments of the present disclosure.

Referring to FIG. 2, the biometric information recognizing module 171 may include a detecting unit 171 and a controlling unit 172.

The detecting unit 171 may include at least one out of: an acceleration sensor, an image sensor, an angular speed sensor, and a gravity sensor, and may sense the orientation of the electronic device 100 using the at least one sensor. For example, accordingly, whether the electronic device 100 is oriented to the horizontal direction or the vertical direction may be sensed.

According to embodiments of the present disclosure, the detecting unit 171 may sense the orientation of the electronic device using or independently from the processor 120, and may recognize biometric information using a parameter corresponding to the sensed orientation.

The control unit 172 may control the parameter, and the parameter may include at least one out of: the length, intensity, and period of an infrared light emission pulse and the sensitivity of an image sensor.

As an example, when the orientation of the electronic device 100 is the horizontal direction, the control unit 172 may control the length of an infrared light emission pulse corresponding to the horizontal direction to be longer than the length of an infrared light emission pulse corresponding to the vertical direction, and may control the intensity of the infrared light emission pulse corresponding to the horizontal direction to be lower than the intensity of the infrared light emission pulse corresponding to the vertical direction, so as to control the parameter. Also, when the electronic device 100 is oriented to the horizontal direction, the biometric information recognizing module 170 may control the sensitivity of an image sensor corresponding to the horizontal direction to be higher than the sensitivity of an image sensor corresponding to the vertical direction.

As another example, when the electronic device 100 is oriented to the vertical direction, the control unit 172 may control the length of an infrared light emission pulse corresponding to the vertical direction to be shorter than the length of an infrared light emission pulse corresponding to the horizontal direction, and may control the intensity of an infrared light emission pulse corresponding to the vertical direction to be higher than the intensity of an infrared light emission pulse corresponding to the horizontal direction, so as to control the parameter. Also, when the electronic device 100 is oriented to the vertical direction, the biometric information recognizing module 170 may control the sensitivity of an image sensor corresponding to the vertical direction to be lower than the sensitivity of an image sensor corresponding to the horizontal direction.

According to another embodiment of the present disclosure, the detecting unit 171 may sense the orientation of the electronic device, and may recognize biometric information using a parameter corresponding to the sensed orientation.

The biometric information recognizing module 170 may map information associated with the sensed orientation of the electronic device and the recognized biometric information, and may store the same. When the electronic device 100 displays a screen that requests biometric information of a user, which is required for executing at least one function, the detecting unit 171 may recognize the biometric information through the displayed screen, may recognize the orientation of the electronic device 100 when the screen is displayed, and may read out biometric information mapped to the recognized orientation.

Accordingly, the control unit 172 may compare the recognized biometric information and the read biometric information, and may control the processor 120 and the elements of the electronic device 100 to perform the function.

As another example, when a recognition rate with respect to the recognized biometric information is less than or equal to a threshold value, the control unit 172 may perform a control to: output a message that requests changing the orientation of the electronic device 100, re-recognize biometric information in the changed orientation, and combine the recognized biometric information and the re-recognized biometric information and store the same in the memory 130. The recognition rate may include information associated with a ratio of an area that the electronic device 100 is capable of recognizing from a photographed iris to the entire area of the recognized biometric information.

Also, according to another embodiment of the present disclosure, the detecting unit 171 may: sense whether the orientation of the electronic device is a first direction or a second direction; recognize first iris information using a parameter including at least one of the length, intensity, and period of an infrared light emission pulse and the sensitivity of an image sensor, based on the sensed first direction; map the recognized first iris information and the first direction; and store the same. When the electronic device moves to the second direction, the biometric information recognizing module 170 may control the parameter, may recognize second iris information using the controlled parameter, may map the recognized second iris information and the second direction, and may store the same.

The control unit 172 may display a screen that requests iris information of a user, which is required for executing at least one function of the electronic device, and may recognize the iris information through the displayed screen. When the screen is displayed, the biometric information recognizing module 170 may recognize the orientation of the electronic device, may read out iris information mapped to the recognized orientation, and may compare the recognized iris information and the read iris information. When the read iris information and the recognized iris information are identical to each other, the control unit 172 may control the processor 120 and the application 134 to execute at least one function of the electronic device.

For example, when the electronic device is oriented to the first direction, the control unit 172 may control the length of an infrared light emission pulse corresponding to the first direction to be longer than the length of an infrared light emission pulse corresponding to the second direction, and may control the intensity of an infrared light emission pulse corresponding to the first direction to be lower than the intensity of an infrared light emission pulse corresponding to the second direction, so as to control the parameter. When the electronic device is oriented to the first direction, the biometric information recognizing module 170 may control the sensitivity of an image sensor corresponding to the first direction to be higher than the sensitivity of an image sensor corresponding to the second direction, so as to control the parameter.

As another example, when the electronic device is oriented to the second direction, the control unit 172 may control the length of an infrared light emission pulse corresponding to the second direction to be shorter than the length of an infrared light emission pulse corresponding to the first direction, and may control the intensity of an infrared light emission pulse corresponding to the second direction to be higher than the intensity of an infrared light emission pulse corresponding to the first direction, so as to control the parameter. When the electronic device is oriented to the second direction, the biometric information recognizing module 170 may control the sensitivity of an image sensor corresponding to the first direction to be lower than the sensitivity of an image sensor corresponding to the second direction, so as to control the parameter. Also, the parameter may be set in advance to correspond to the recognized orientation.

Figure 3:
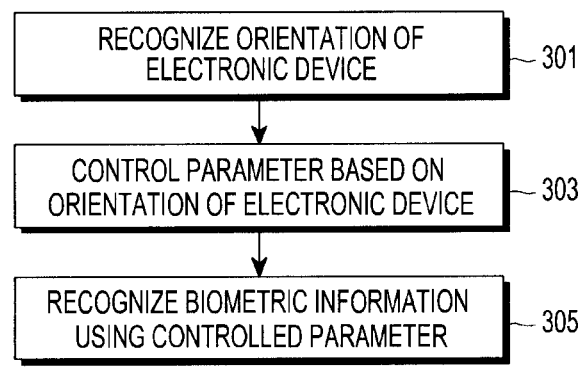
FIG. 3 is a flowchart illustrating operations of an electronic device according to various embodiments of the present disclosure.

FIG. 3 is a flowchart illustrating operations of an electronic device according to various embodiments of the present disclosure.

Figure 12A:
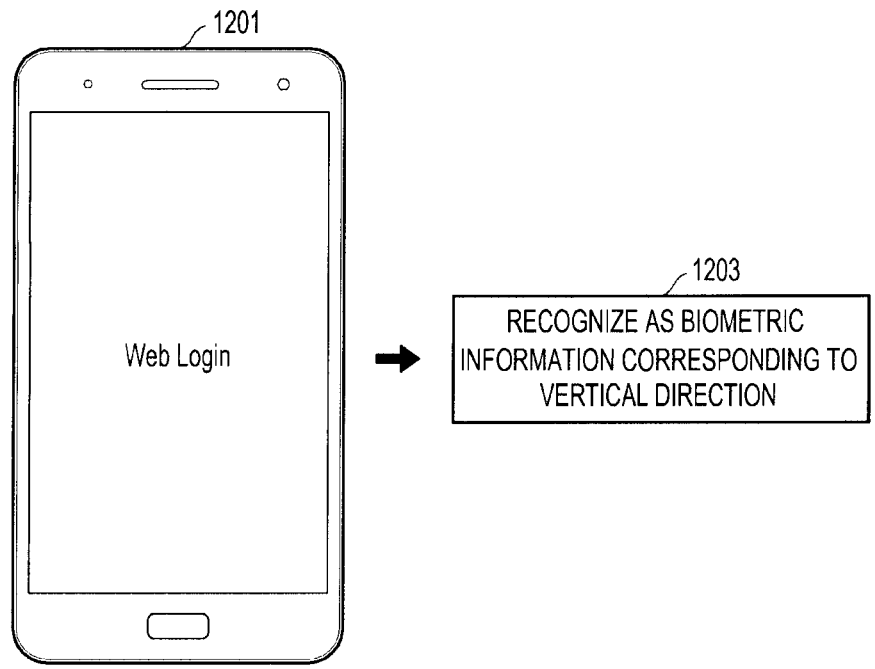
FIG. 12A and FIG. 12B are diagrams illustrating a screen that executes a function of an electronic device using recognized biometric information according to an orientation of the electronic device according to various embodiments of the present disclosure.
Figure 12B:
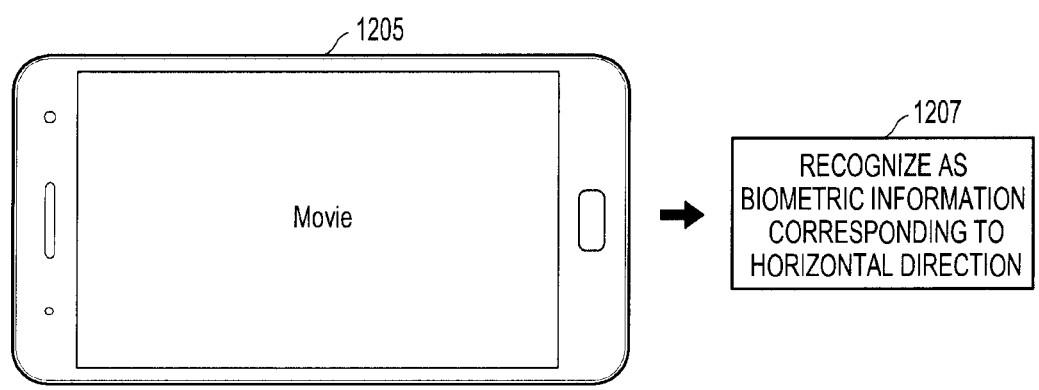

Referring to FIG. 3, an electronic device senses the orientation of the electronic device to recognize biometric information in operation 301. The biometric information may include, for example, iris information, fingerprint information, vein information, and the like in association with a user. The orientation of the electronic device may be, for example, the horizontal direction or the vertical direction. For example, when it is recognized that the electronic device is oriented to the horizontal direction, the horizontal direction may be the direction in which the electronic device displays a movie, as shown in FIG. 12B. Conversely, when it is recognized that the electronic device is oriented to the vertical direction, the vertical direction may be the direction in which the electronic device displays a web login screen as shown in FIG. 12A. As another example, sensing whether the direction of the electronic device is the horizontal direction or the vertical direction may be determined based on an automatic rotation function of the electronic device. For example, the automatic rotation function may be embodied using at least one of an acceleration sensor, an image sensor, an angular speed sensor, and a gravity sensor of the electronic device.

The electronic device controls a parameter corresponding to the sensed orientation in operation 303. The parameter may include at least one of the length, intensity, and period of an infrared light emission pulse, and the sensitivity of an image sensor.

For example, the parameter corresponding to the sensed orientation may be controlled to enable the length of an infrared light emission pulse corresponding to the horizontal direction to be longer than the length of an infrared light emission pulse corresponding to the vertical direction of the electronic device. Also, the parameter may be controlled to enable the intensity of the infrared light emission pulse corresponding to the horizontal direction to be lower than the intensity of the infrared light emission pulse corresponding to the vertical direction. Also, the parameter may be controlled to enable the sensitivity of an image sensor corresponding to the horizontal direction to be higher than the sensitivity of an image sensor corresponding to the vertical direction of the electronic device.

The electronic device recognizes biometric information using the set parameter in operation 305. The set parameter may be a parameter corresponding to the orientation of the electronic device.

As another example, the electronic device may sense the orientation of the electronic device to recognize biometric information, and may recognize biometric information using a parameter corresponding to the sensed orientation. The electronic device may store a parameter corresponding to each sensed orientation, and may recognize biometric information using a parameter corresponding to a sensed orientation. Accordingly, when the sensed orientation is the horizontal direction, the biometric information may be recognized using a parameter corresponding to the horizontal direction. Conversely, when the sensed orientation is the vertical direction, the biometric information may be recognized using a parameter corresponding to the vertical direction. In this instance, the biometric information may be recognized using a parameter stored in advance, or a parameter set in advance, without controlling a parameter (operation 303) separately based on the orientation of a terminal.

Figure 4:
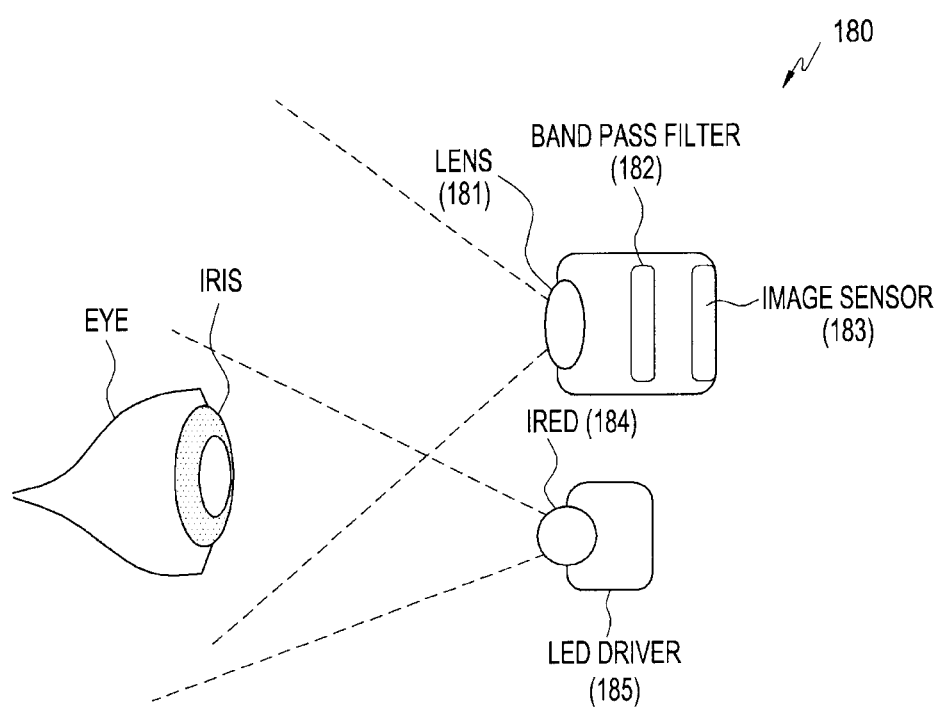
FIG. 4 is a diagram illustrating a configuration of a camera module according to various embodiments of the present disclosure.

FIG. 4 is a diagram illustrating a configuration of a camera module according to various embodiments of the present disclosure.

Referring to FIG. 4, according to an embodiment, an electronic device may include: a camera module 180 including an image sensor 183, a band pass filter 182, a lens 181; an infrared light emitting unit (infra red emitting diode (IRED)) 184, and a light emitting diode (LED) driver 185.

The IRED 184 may emit light of a predetermined wavelength band. For example, the infrared light emitting unit 184 may emit light as a continuous wave, and may emit a pulse through the synchronization with an input frame of the image sensor 183. For example, the LED driver 185 may drive the infrared light emitting unit 184 according to the control of the biometric information recognizing module 170.

The LED driver 185 may control the intensity of a current so as to control the intensity of the infrared light emitting unit 184, and may determine, for example, the continuous wave and pulse wave.

The lens 181 may receive light for inputting the iris of a user, and the light that is incident to the lens 181 may reach the band pass filter 182.

The band pass filter 182 may be disposed in the backend of the lens 181, and may pass a wavelength of a predetermined band out of the incident light. The band pass filter 182 may correspond to a wavelength band including at least some of a wavelength band emitted through the infrared light emitting unit 184. For example, an optical signal including a wavelength of the predetermined band, which passes through the band pass filter 182, may arrive at the image sensor 183.

The image sensor 183 may change the optical signal that passes through the band pass filter 182 into a digital signal, and may output the same to the iris detecting module 170 through the bus 110.

Referring to FIG. 4, the infrared light emitting unit 184 emits an infrared light having a wavelength of a predetermined band, and the lens 183 receives light reflected by an eye (iris). In this instance, the band pass filter 182 that has a wavelength band including at least some of a wavelength band emitted by the infrared light emitting unit 184, may be disposed in the backend of the lens 182. Accordingly, an optical signal having the predetermined wavelength band may be converted into a digital signal by the image sensor 183. The digital signal may be processed in the biometric information recognizing module 170 and thus, an iris image may be generated. Therefore, the camera module including the lens 181, the band pass filter 182, the image sensor 183, and the infrared light emitting unit 184 may be mounted to be adjacent to each other in the outside of the electronic device 100, or may be mounted to be the minimum distance distant away from each other.

The camera module 180 according to another embodiment may include the lens 181 and the image sensor 183. In this instance, the image sensor 183 may be an image sensor having a high resolution that is greater than or equal to a predetermined resolution. In this instance, a separate infrared light emitting unit 184 may not be included.

Figure 5A:
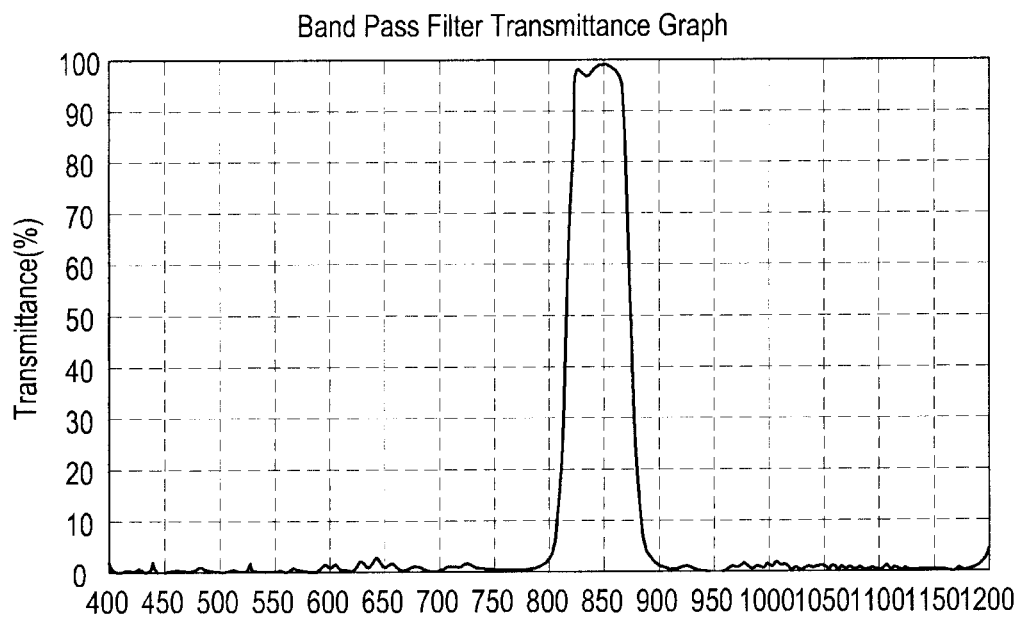
FIG. 5A is a diagram illustrating a frequency characteristic of a band pass filter according to various embodiments of the present disclosure.
Figure 5B:
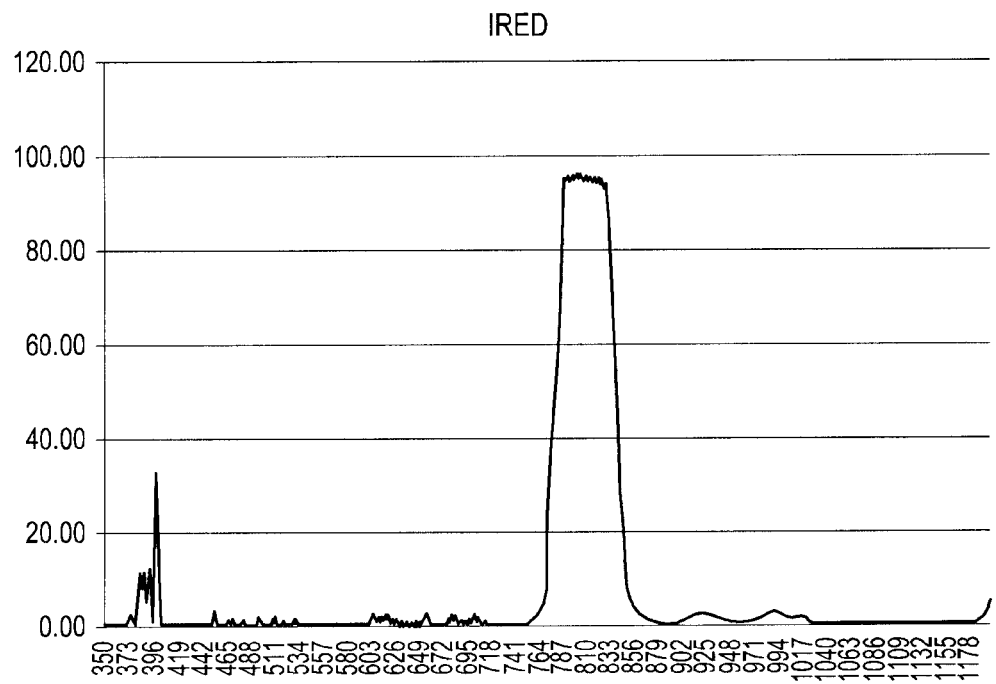
FIG. 5B is a diagram illustrating a frequency characteristic of an infrared light emitting unit according to various embodiments of the present disclosure.

FIG. 5A illustrates an example of a frequency characteristic of the band pass filter 182 that may be included in the electronic device 100 according to various embodiments of the present disclosure, and FIG. 5B illustrates an example of a frequency characteristic of the infrared light emitting unit 184 according to various embodiments of the present disclosure.

Referring to FIGS. 5A and 5B, when the infrared light emitting unit 184 emits light of a wavelength band of (850) nm±50 nm, the band pass filter 182 may use a filter that passes a wavelength band of (1450) nm±50 nm including the center wavelength band of the infrared light emitting unit 184, so as to selectively receive light of a wavelength band emitted by the infrared light emitting unit 184. Through the above, a malfunction caused by light of neighboring another infrared wavelength band may be prevented.

Figure 6A:
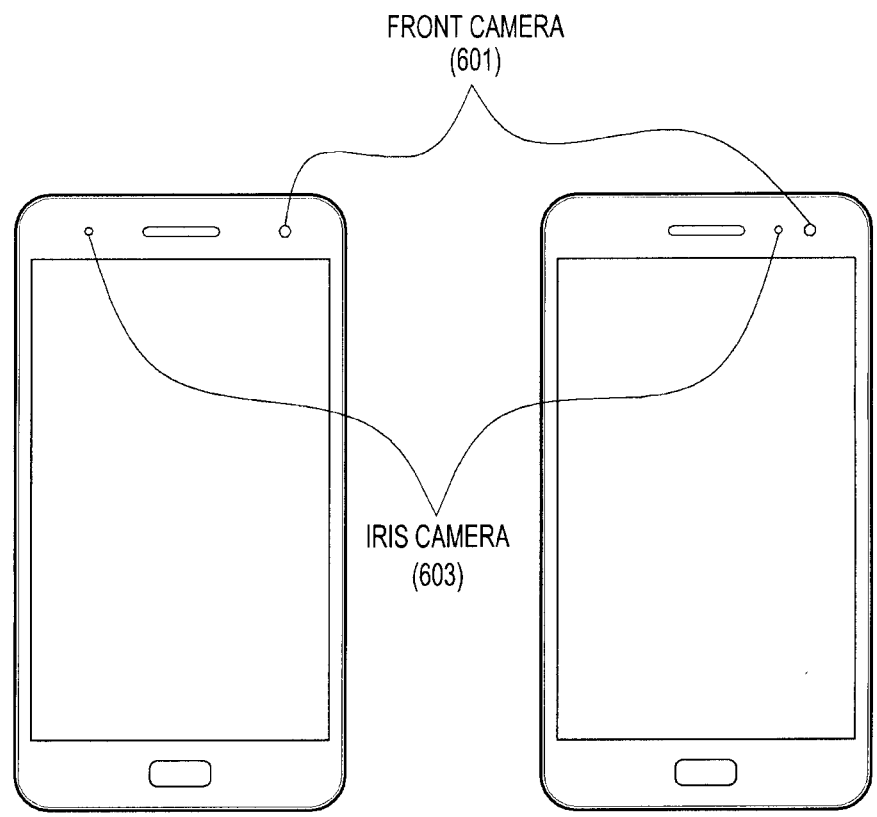
FIG. 6A and FIG. 6B are a front perspective view of an electronic device according to various embodiments of the present disclosure.
Figure 6B:
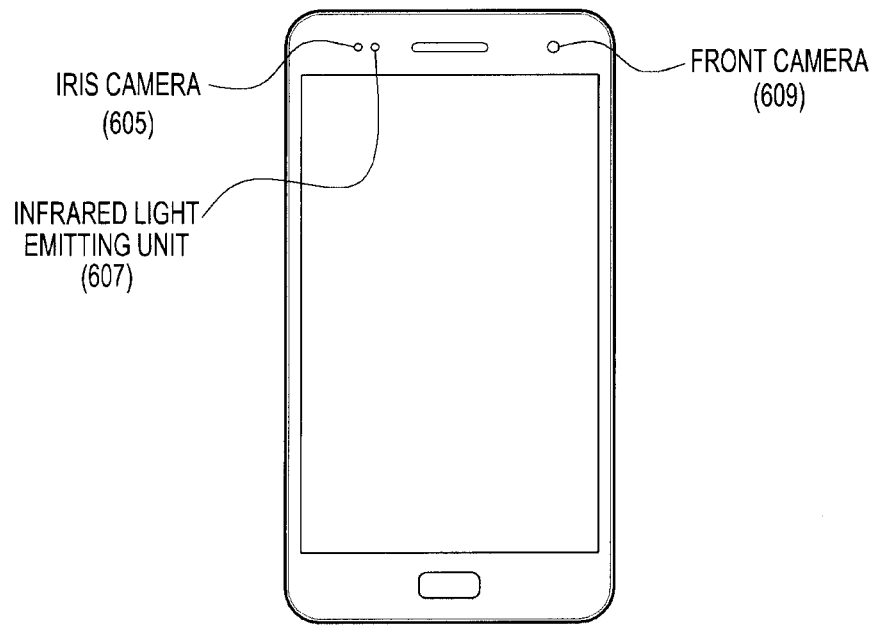

FIGS. 6A and 6B are front perspective views of an electronic device according to various embodiments of the present disclosure.

Referring to FIG. 6A, the electronic device may include at least one of an iris camera for iris recognition, a normal front camera, and an infrared light emitting unit. According to an embodiment, the iris camera 603 and the normal front camera 601 may be located in the top of the display of the electronic device. The iris camera may include an infrared light emitting unit.

Referring to FIG. 6B, according to another embodiment, the iris camera may not include an infrared light emitting unit. In this instance, the iris camera 605 and the normal front camera 609 may be disposed a predetermined distance distant away from each other. For example, an infrared light emitting unit 607 and a receiver may be disposed between the iris camera 605 and the normal front camera 609. Also, according to another embodiment, the iris camera 605 and the normal front camera 609 may be mounted in series in one side. In this instance, the iris camera 605 and the infrared light emitting unit 607 may be disposed to be adjacent to each other.

Figure 7A:
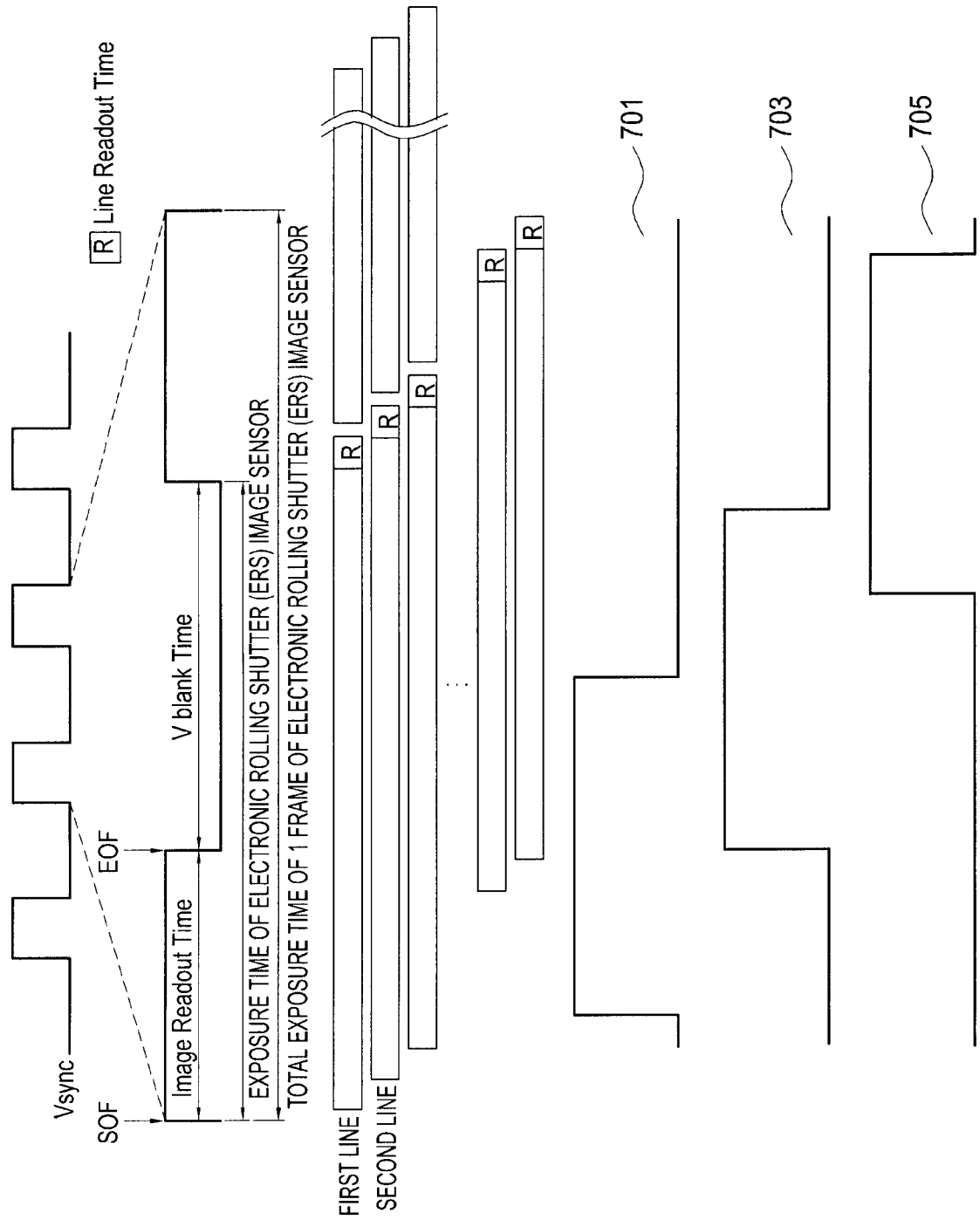
FIG. 7A is a diagram illustrating an infrared light emission pulse and an image sensor operation point according to various embodiments of the present disclosure.
Figure 7B:
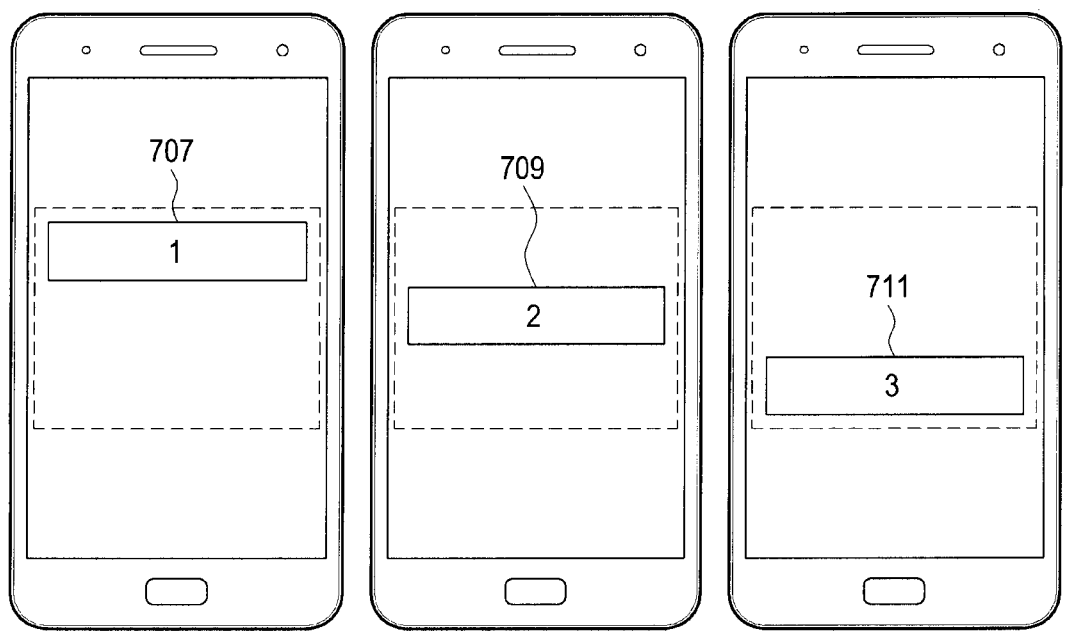
FIG. 7B is a diagram illustrating a screen of an electronic device corresponding to an infrared light emission pulse according to various embodiments of the present disclosure.

FIGS. 7A and 7B illustrate a data readout method of a rolling shutter and a controlling method of an infrared light emitting unit according to various embodiments of the present disclosure.

Particularly, FIG. 7A is a diagram illustrating an infrared light emission pulse and an image sensor operation point according to various embodiments of the present disclosure, and FIG. 7B is a diagram illustrating a screen of an electronic device corresponding to an infrared light emission pulse according to various embodiments of the present disclosure.

Referring to FIGS. 7A and 7B, according to various embodiments of the present disclosure, a location where an infrared light is actually emitted brightest may be shown based on a timing of an infrared light emission pulse.

According to various embodiments of the present disclosure, an image sensor may include a plurality of lines (a first line, a second line, and the like). The plurality of lines may include a plurality of pixels. The plurality of lines included in an image sensor may sequentially obtain image information based on a driving signal (e.g., vertical synchronization signal Vsync) of the image sensor. For example, the plurality of lines included in the image sensor may be exposed to an infrared light reflected by a subject during a predetermined period of time, so as to obtain information associated with an image. For example, each line included in the image sensor may be sequentially exposed. In this instance, there may be a difference in time between a point in time when a first pixel of the first line is exposed to an infrared light reflected by the subject and a point in time when a first pixel of the second line is exposed to the reflected infrared light.

For example, the difference in time may be as much as a line readout time.

The line readout time may be, for example, a time expended for storing image information (e.g., output image information corresponding to each line) associated with a subject that each of the plurality of lines obtains. The line readout time may be variously embodied according to a designer or a feature of an electronic device, according to various embodiments.

According to the embodiment, when the length of an infrared light emission pulse is shorter than the length from an exposure start time of the first pixel of the first line of the rolling shutter to an exposure time of a last pixel of a last line, there may be a difference in brightness between the top and the bottom of an image input into the iris camera.

For example, when an infrared light emission pulse is provided in a front part of the rolling shutter as shown in the diagram 701, a first line receives the greatest amount of infrared light, and an amount of time in which a subsequent line receives infrared light is gradually reduced. Therefore, the upper part of the input image may be shown to be the brightest as shown in the diagram 707.

As another example, when an infrared light emission pulse is provided in an intermediate part of the rolling shutter as shown in the diagram 703, an intermediate line receives the greatest amount of infrared light, and an amount of time in which a previous line and a subsequent line receives infrared light is gradually reduced. Therefore, the intermediate part of the input image may be shown to be the brightest as shown in the diagram 709.

As another example, when an infrared light emission pulse is provided in an end part of the rolling shutter as shown in the diagram 705, the first line may receive the smallest amount of infrared light, and a time expended for receiving infrared light may be gradually increased for a previous line, and the bottom of the input image may be the brightest as shown in the diagram 711.

That is, based on the length and the period of an infrared light emission pulse, an area capable of recognizing biometric information may be determined.

Figure 8A:
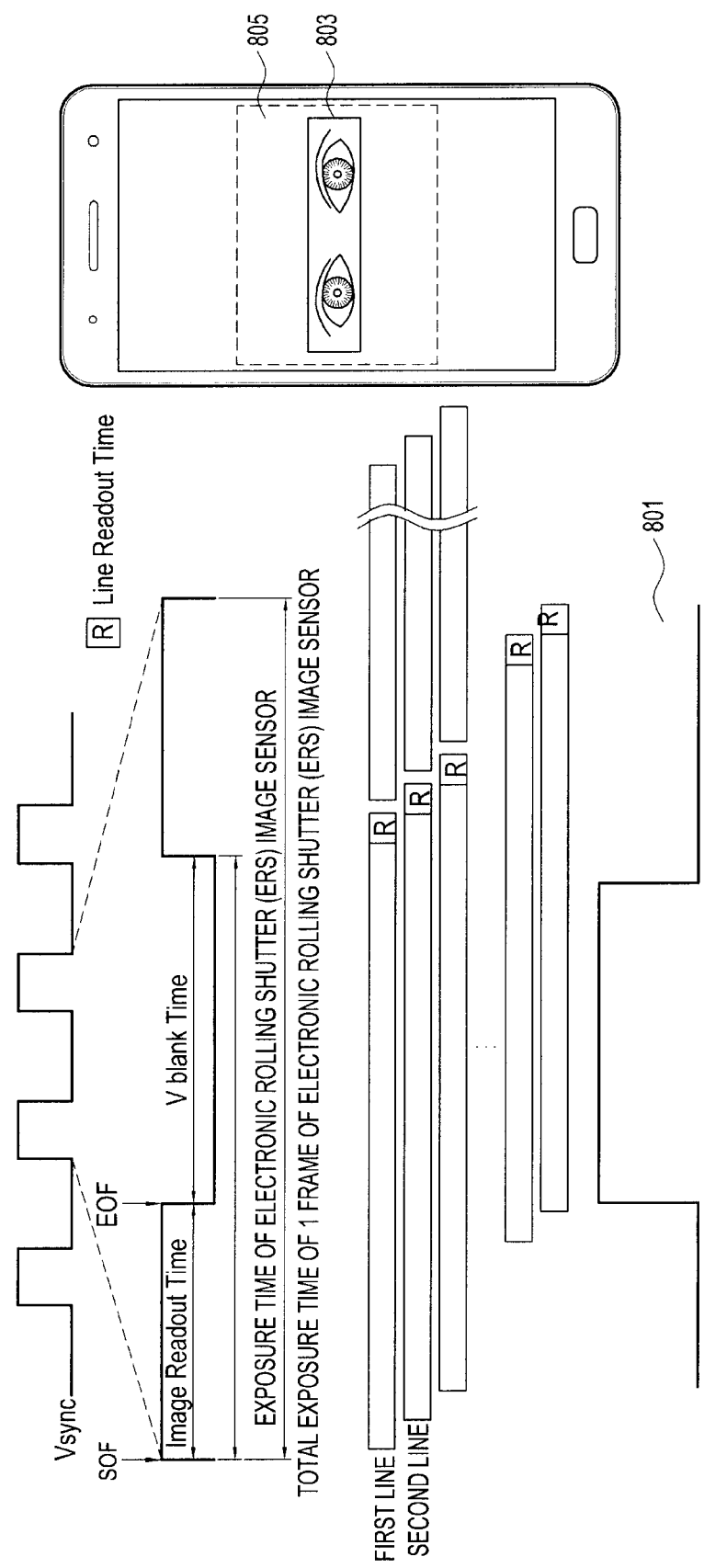
FIG. 8A is a diagram illustrating a relationship between an orientation of an electronic device and an infrared light emission pulse according to a first embodiment of the present disclosure.

FIG. 8A is a diagram illustrating a relationship between an orientation of an electronic device and an infrared light emission pulse according to a first embodiment of the present disclosure.

Referring to FIG. 8A, according to the first embodiment of the present disclosure, when a time of an infrared light emission pulse 801 is shorter than a first frame exposure time of an image sensor, the electronic device may determine a relatively brighter area 803 corresponding to an area including at least one line of the image sensor. Also, the area including the at least one line of the image sensor may be displayed on a screen of the electronic device as a preview image 805.

According to the first embodiment, when the electronic device is oriented to the vertical direction, two eyes of a user are received in an emission area of an infrared light emitting unit and thus, biometric information may be recognized. Also, even when a single eye is received in the emission area of the infrared light emitting unit, biometric information may be recognized by adjusting a location up and down.

When the electronic device according to the first embodiment of the present disclosure is rotated by 90 degrees, the readout of the image sensor may be executed in the vertical direction. In this instance, the infrared light emitting unit executes a recognition in the vertical direction and thus, when photographing is performed using an infrared light emission pulse having a length that is the same as the length of the above described infrared light emission pulse, two eyes of the user may not be received in an emission area of the infrared light emitting unit.

Figure 8B:
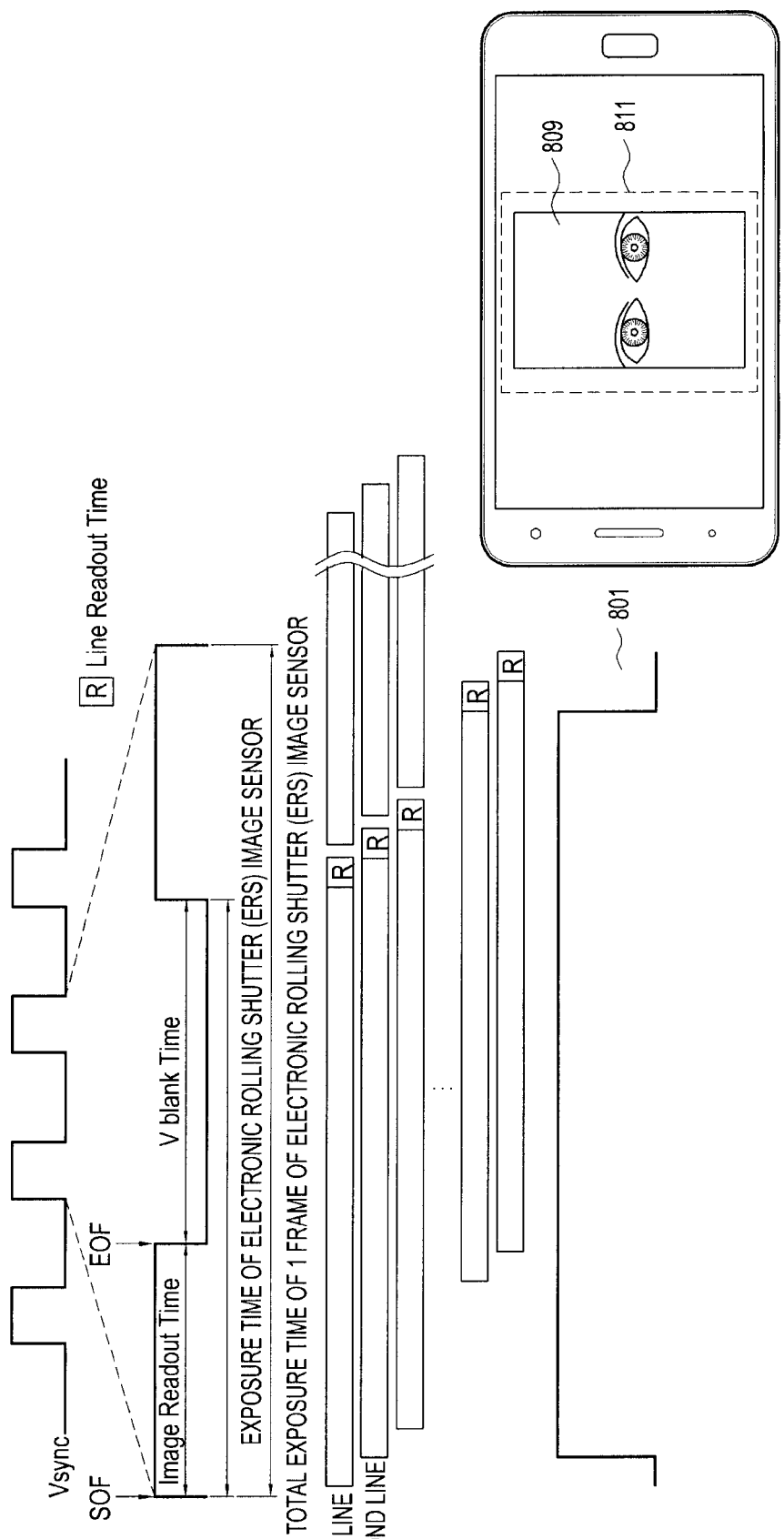
FIG. 8B is a diagram illustrating a relationship between an orientation of an electronic device and an infrared light emission pulse according to a second embodiment of the present disclosure.

FIG. 8B is a diagram illustrating a relationship between an orientation of an electronic device and an IRED pulse according to a second embodiment of the present disclosure.

Referring to FIG. 8B, according to the second embodiment of the present disclosure, when a time of an infrared light emission pulse 801 is longer than a first frame exposure time of an image sensor, the electronic device may determine a relatively brighter area 809 corresponding to an area including at least one line of the image sensor. Also, the area including the at least one line of the image sensor may be displayed on a screen of the electronic device as a preview image 811.

According to the second embodiment of the present disclosure, when the electronic device is oriented to the horizontal direction, the electronic device may control the length of an infrared light emission pulse to be longer than that of the case in which the electronic device is oriented to the vertical direction, so as to expand the range of a relatively brighter area corresponding to an area including at least one line of the image sensor.

According to the above described first embodiment and second embodiment, the electronic device may sense the orientation (the horizontal direction and the vertical direction) of the electronic device, and may control a parameter corresponding to the sensed orientation. The parameter may include at least one of the length, intensity, and period of an infrared light emission pulse and the sensitivity of an image sensor.

For example, as illustrated in FIG. 8B, the length of an infrared light emission pulse corresponding to when the electronic device is oriented to the horizontal direction may be controlled to be longer than the length of an infrared light emission pulse corresponding to when the electronic device is oriented to the vertical direction. Accordingly, the intensity of the infrared light emission pulse corresponding to when the electronic device is oriented to the horizontal direction may be lowered to be inversely proportional to the length of the length of the infrared light emission pulse, so that the light emission energy of the entire infrared light emission pulse may be maintained to be constant. Accordingly, the electronic device may prevent the emission energy of an infrared light emission pulse from hindering the stability of a user's eyes. Also, as the length of an infrared light emission pulse becomes longer, a larger number of image sensor lines 809 may be included as shown in the electronic device of FIG. 8B, and thus, an emission area becomes broader.

Also, according to the second embodiment, the intensity of an infrared light emission pulse is relatively lowered when compared to the first embodiment, the total amount of light incident to the image sensor may be relatively smaller. Accordingly, although a small amount of light is incident, the image sensor according to the second embodiment may perform a biometric information recognition in a level less than or equal to that of the first embodiment by raising the sensitivity of the image sensor.

Also, the processor of the electronic device may offset, using a noise reduction function, noise that may occur when raising the sensitivity of the image sensor of the second embodiment when compared to the image sensor of the first embodiment.

Figure 9A:
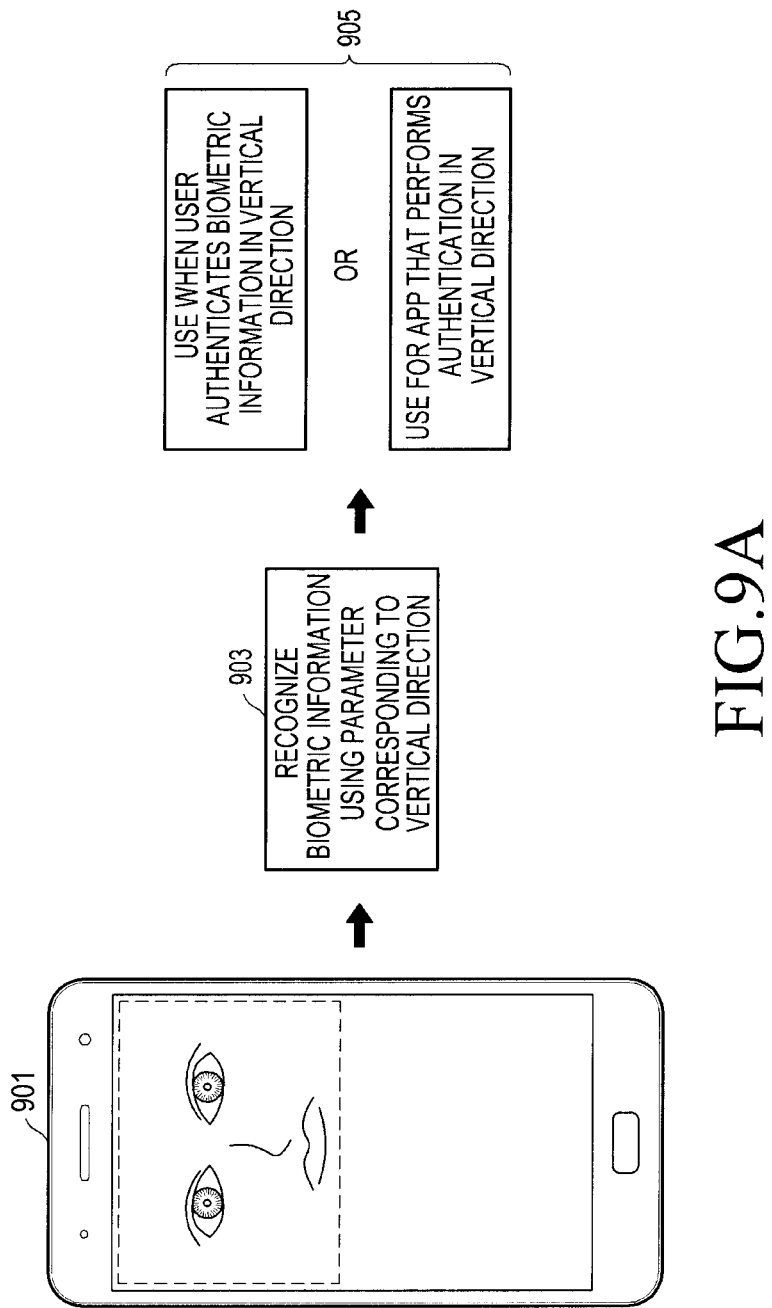
FIG. 9A is a diagram illustrating a procedure that recognizes biometric information and uses the recognized biometric information according to an embodiment of the present disclosure.
Figure 9B:
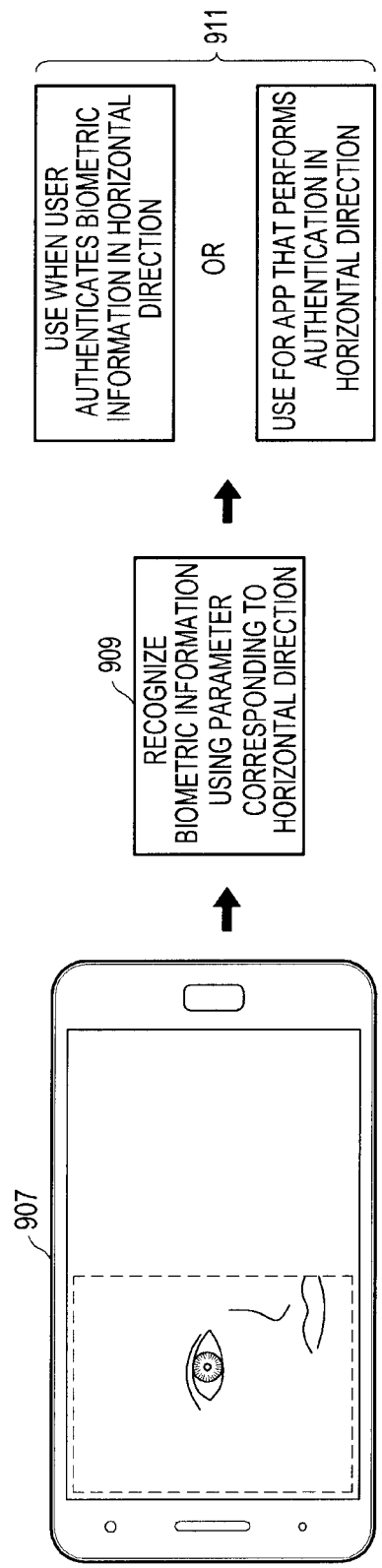
FIG. 9B is a diagram illustrating a procedure that recognizes biometric information and uses the recognized biometric information according to another embodiment of the present disclosure.

FIGS. 9A and 9B are diagrams illustrating processes that sense the orientation of an electronic device, recognize biometric information using the sensed orientation and a parameter corresponding to the sensed orientation, and use the recognized biometric information, according to embodiments of the present disclosure.

FIG. 9A is a diagram illustrating a procedure that recognizes biometric information and uses the recognized biometric information according to an embodiment of the present disclosure.

Referring to FIG. 9A, according to an embodiment, an electronic device 901 senses the orientation of the electronic device, and recognizes biometric information using a parameter corresponding to the sensed orientation in operation 903. The recognized biometric information may be stored together with the orientation sensed by the electronic device. For example, in the case in which the electronic device recognizes biometric information when the electronic device is oriented to the horizontal direction, the electronic device may map orientation information indicating that the electronic device is oriented to the horizontal direction and the recognized biometric information, and may store the same. For example, the orientation information may be stored in the biometric information as tag information, or may be stored in the recognized biometric information in the form of a watermark. The stored orientation information is to be used when a user proceeds with an authentication procedure in the same direction, in operation 905. For example, when the user attempts to authenticate biometric information in the horizontal direction, the electronic device calls biometric information corresponding to the horizontal direction, which is stored in the memory, and performs a comparison so as to perform authentication with respect to the biometric information. That is, the electronic device calls biometric information corresponding to the orientation information (horizontal direction) to authenticate biometric information of the user when the electronic device is oriented to the horizontal direction, and performs an authentication procedure. Also, the electronic device calls biometric information corresponding to the orientation information (horizontal direction) and performs an authentication procedure in order to authenticate biometric information of the user in an app that operates in the horizontal direction.

FIG. 9B is a diagram illustrating a procedure that recognizes biometric information and uses the recognized biometric information according to another embodiment of the present disclosure.

Referring to FIG. 9B, an electronic device according to an embodiment of the present disclosure may store biometric information of a user, together with an orientation in which the electronic device recognizes the biometric information. For example, in the case in which the electronic device recognizes biometric information when the electronic device is oriented to the vertical direction, the electronic device may map orientation information of the electronic device and the recognized biometric information, and store the same. For example, the orientation information may be stored in the biometric information as tag information, or may be stored in the recognized biometric information in the form of a watermark. The stored orientation information is to be used when a user proceeds with an authentication procedure in the same orientation, in operation 905. For example, when the user attempts to authenticate biometric information in the vertical direction, the electronic device calls biometric information corresponding to the vertical direction, which is stored in the memory, and performs a comparison so as to perform authentication with respect to the biometric information. That is, the electronic device calls biometric information corresponding to the orientation information (vertical direction) and performs an authentication procedure in order to authenticate biometric information of the user when the electronic device is oriented to the vertical direction. Also, the electronic device calls biometric information corresponding to the orientation information (vertical direction) and performs an authentication procedure in order to authenticate biometric information of the user when the electronic device is oriented to the vertical direction.

Figure 10A:
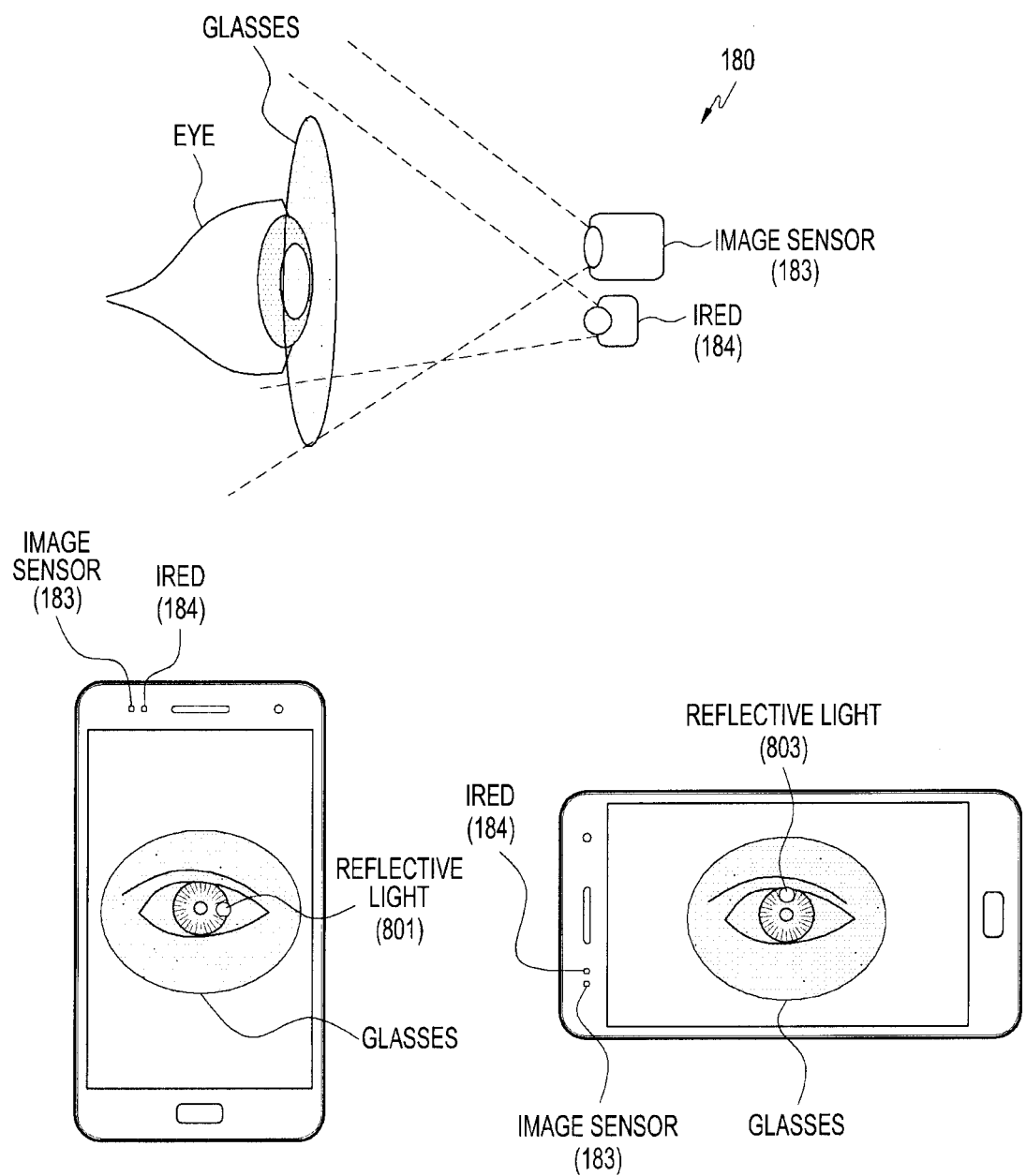
FIG. 10A is a diagram illustrating an example in which an electronic device recognizes biometric information according to various embodiments of the present disclosure.

FIG. 10A is a diagram illustrating an operation in which an electronic device recognizes biometric information according to various embodiments of the present disclosure.

Referring to FIG. 10A, according to an embodiment of the present disclosure, a biometric information recognizing method of an electronic device may sense the orientation of the electronic device, and may recognize biometric information using a parameter corresponding to the sensed orientation. When a recognition rate with respect to the recognized biometric information is less than or equal to a threshold value, the method may output a message that requests changing the orientation of the electronic device, may re-recognize biometric information in the changed orientation, and may combine and store the recognized biometric information and the re-recognized biometric information. The recognition rate may be a ratio of an area that the electronic device is capable of recognizing from a photographed living body to the entire area of the photographed living body.

Also, for example, when the electronic device recognizes iris information in one direction, the user may not properly recognize the iris information due to light reflected by glasses or contacts worn by a user. For example, light, which is emitted from the infrared light emitting unit 184, may be reflected by glasses or contacts, and may be incident to the image sensor 183 included in the camera module 180. A part where a reflective light appears may be a part 803 in which a corresponding location of an image sensor is saturated with light, and iris information of the corresponding part may not be recognized. In this instance, the electronic device may determine a recognition rate associated with the iris information, may compare the determined recognition rate and a threshold value, and may determine whether to re-recognize iris information. When the determination shows that the recognition rate is less than or equal to the threshold value, the electronic device may display a screen that requests re-recognition of iris information in another direction (horizontal direction or vertical direction). Accordingly, the electronic device may re-recognize iris information, may combine the re-recognized iris information and the iris information of which the recognition rate is less than or equal to a threshold value, and may store final iris information.

Figure 10B:
FIG. 10B is a diagram illustrating a procedure in which an electronic device combines recognized biometric information and generates final biometric information according to various embodiments of the present disclosure.

FIG. 10B is a diagram illustrating a procedure in which an electronic device combines recognized biometric information and generates final biometric information according to various embodiments of the present disclosure.

Referring to FIG. 10B, according to various embodiments of the present disclosure, when an image sensor of the electronic device is physically located on the left side of an infrared light emitting unit, a reflective light may occur in the right part of an iris. In this instance, the recognition rate of the iris information 805 recognized by the electronic device may be less than or equal to a threshold value, due to the reflective light occurring in the right part.

As another example, when the electronic device rotates by 90 degrees, and re-recognizes iris information, the infrared light emitting unit may be located above the iris. In this instance, the recognition rate of the iris information 807 re-recognized by the electronic device may be less than or equal to a threshold value, due to a reflective light occurring in the upper part.

Accordingly, the electronic device may generate final iris information 809 by combining the recognized iris information 805 and the re-recognized iris information 807, and may store the final iris information 809.

Figure 11:
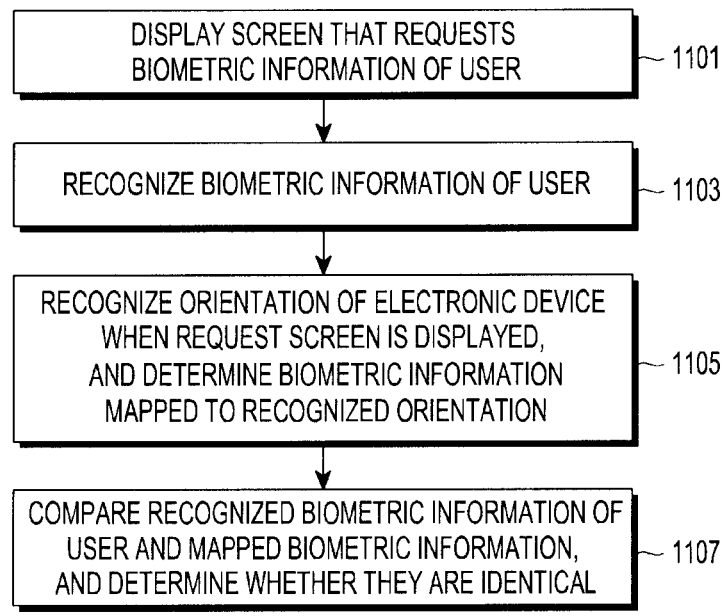
FIG. 11 is a flowchart illustrating a process in which an electronic device utilizes recognized biometric information according to various embodiments of the present disclosure.

FIG. 11 is a flowchart illustrating a process in which an electronic device utilizes recognized biometric information according to various embodiments of the present disclosure.

Referring to FIG. 11, an iris information recognizing method of an electronic device may: sense whether the orientation of the electronic device is a first direction or a second direction; recognize first iris information using a parameter including at least one of the length, intensity, and period of an infrared light emission pulse and a sensitivity of an image sensor, based on the sensed first direction; map the recognized first iris information and the first direction; and store the same, according to various embodiments of the present disclosure. When the electronic device moves to the second direction, the electronic device may control the parameter, may recognize second iris information using the controlled parameter, may map the recognized second iris information and the second direction, and may store the same. For example, the first direction and the second direction may be the horizontal direction or the vertical direction.

The electronic device displays a screen that requests biometric information of a user in operation 1101. When the screen that requests the biometric information of the user may be a screen that request iris information of the user, which is required for executing at least one function of the electronic device.

Accordingly, the electronic device recognizes the biometric information of the user from the screen that requests the iris information in operation 1103. To recognize the biometric information of the user, the electronic device may sense the orientation of the electronic device, and may recognize biometric information using a parameter corresponding to the sensed orientation.

When the screen that requests the iris information is displayed, the electronic device senses the orientation of the electronic device, and determines the sensed orientation and mapped biometric information in operation 1105. That is, the electronic device senses the orientation of the electronic device when the iris information of the user is recognized in operation 1101, and determines biometric information that is stored after being mapped to information associated with the sensed orientation.

The electronic device compares the recognized biometric information of the user and the mapped biometric information, and determines whether they are identical in operation 1107. When the determination shows that the recognized biometric information of the user is identical to the mapped biometric information, the electronic device may perform at least one function of the electronic device.

FIG. 12A and FIG. 12B are diagrams illustrating a screen that executes a function of an electronic device using recognized biometric information according to the orientation of the electronic device according to various embodiments of the present disclosure.

Referring to FIG. 12A, for example, an electronic device stores iris information for each orientation, and uses the iris information for different situations. For example, when a user uses the electronic device 1201 in the vertical direction, executes a web login, the electronic device may execute a biometric information recognition using biometric information registered in the vertical direction. Referring to FIG. 12B, according to another embodiment, when a user uses an electronic device 1205 in the horizontal direction and views a video, the electronic device may execute a biometric information recognition using biometric information stored in the horizontal direction.

Figure 13:
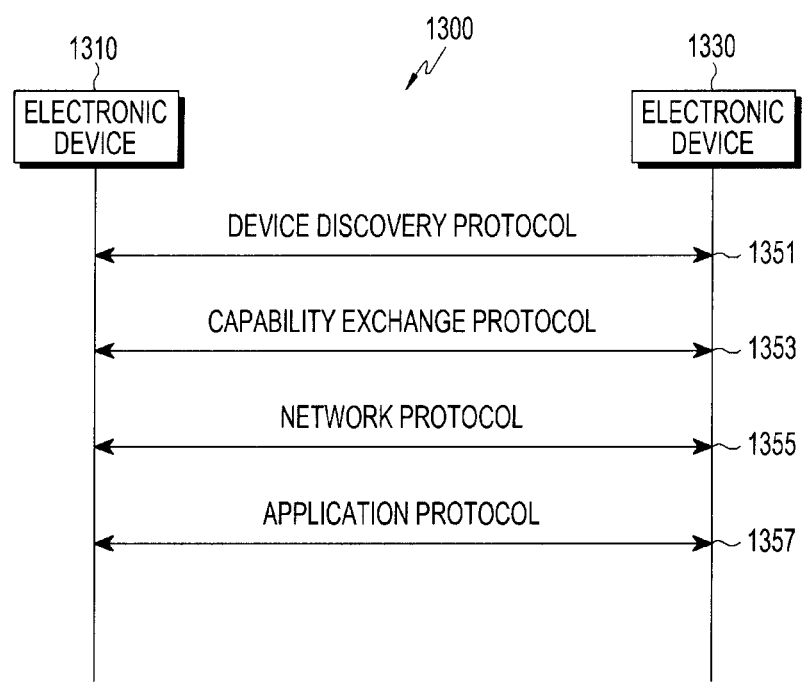
FIG. 13 is a diagram illustrating a communication protocol between electronic devices according to various embodiments of the present disclosure.

FIG. 13 is a diagram illustrating a communication protocol between electronic devices according to various embodiments of the present disclosure.

Referring to FIG. 13, for example, the communication protocol 1300 may include a device discovery protocol 1351, a capability exchange protocol 1353, a network protocol 1355, an application protocol 1357, and the like.

According to an embodiment of the present disclosure, the device discovery protocol 1351 may be a protocol used when the electronic devices (e.g., an electronic device 1310 or an electronic device 1330) detect an external electronic device, which can communicate with the electronic devices or establish a connection with the detected external electronic device. For example, the electronic device 1310 may detect the electronic device 1330 as a device that is capable of communicating with the electronic device 1310 through a communication method (e.g., Wi-Fi, BT, USB or the like), which may be used by the electronic device 1310 using the device discovery protocol 1351. For a communication connection with the electronic device 1330, the electronic device 1310 may acquire identification information of the electronic device 1330 detected through the device discovery protocol 1351, and may store the acquired identification information. For example, the electronic device 1310 may establish a communication connection with the electronic device 1330 based on at least the identification information.

According to an embodiment, the device discovery protocol 1351 may be a protocol for a mutual authentication among a plurality of electronic devices. For example, the electronic device 1310 may perform authentication between the electronic device 1310 and the electronic device 1330, based on communication information (e.g., a media access control (MAC) address, a universally unique identifier (UUID), a subsystem identification (SSID), and an information provider (IP) address) for the connection with the electronic device 1330.

According to an embodiment, the capability exchange protocol 1353 may be a protocol for exchanging information related to a service function that is supported by at least one of the electronic device 1310 and the electronic device 1330. For example, the electronic device 1310 and the electronic device 1330 may mutually exchange information related to currently provided service functions through the capability exchange protocol 1353. The exchangeable information may include identification information indicating a particular service among a plurality of services that can be supported by the electronic device 1310 or the electronic device 1330. For example, the electronic device 1310 may receive identification information of a particular service provided by the electronic device 1330, from the electronic device 1330 through the capability exchange protocol 1353. In this instance, the first electronic device 1310 may determine whether the particular service can be supported by the electronic device 1310 itself based on the received identification information.

According to an embodiment, the network protocol 1355 may be a protocol for controlling flows of data which are transmitted/received to provide a service through interworking between the electronic devices (e.g., the electronic device 1310 and the electronic device 1330) which are connected to communicate with each other. For example, at least one of the electronic device 1310 and the electronic device 1330 may control an error or data quality using the network protocol 1355. Additionally or alternatively, the network protocol 1355 may determine a transmission format of data transmitted/received between the electronic device 1310 and the electronic device 1330. In addition, using the network protocol 1355, at least one of the electronic devices 1310 and 1330 may perform session management (e.g., session connection or session termination) for data exchange between the electronic devices.

According to an embodiment of the present disclosure, the application protocol 1357 may be a protocol for providing a process or information for exchanging data related to a service provided to an external electronic device. For example, the electronic device 1310 (e.g., the electronic device 101) may provide a service to the electronic device 1330 through the application protocol 1357.

According to an embodiment, the communication protocol 1300 may include a standard communication protocol, a communication protocol designated by an individual or organization (e.g., a communication protocol self-designated by a communication device manufacturing company, a network supplying company, or the like) or a combination thereof.

Figure 14:
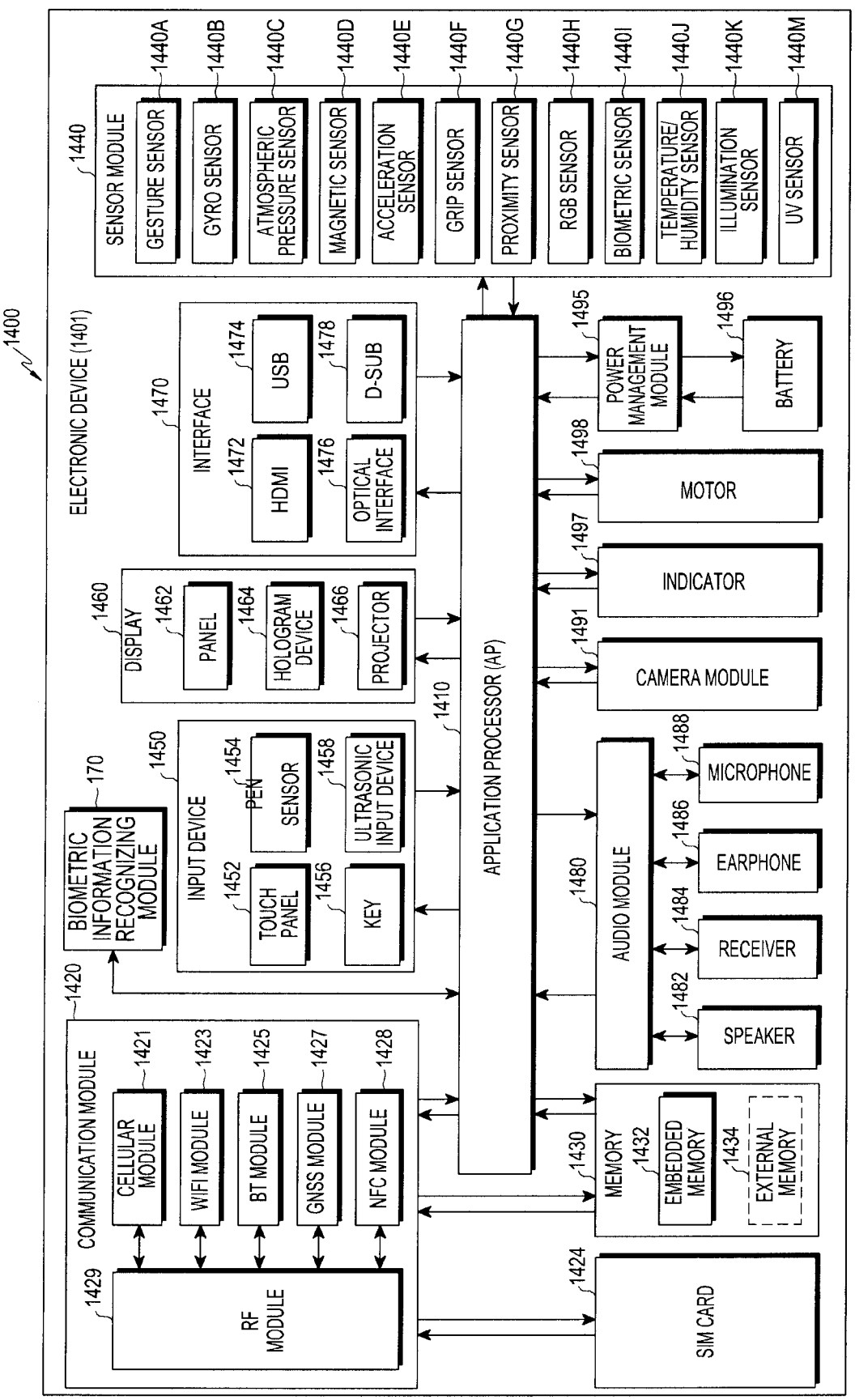
FIG. 14 is a block diagram of an electronic device according to various embodiments of the present disclosure.

FIG. 14 is a block diagram of an electronic device according to various embodiments of the present disclosure.

FIG. 14 illustrates a block diagram 1400 of an electronic device 1401 according to various embodiments of the present disclosure. The electronic device 1401 may form, for example, a part or the entirety of the electronic device 100 illustrated in FIG. 1. The electronic device 1401 may include at least one application processor (AP) 1410, a communication module 1420, a subscriber identification module (SIM) card 1424, a memory 1430, a sensor module 1440, an input device 1450, a display 1460, an interface 1470, an audio module 1480, a camera module 1491, a power management module 1495, a battery 1496, an indicator 1497, and a motor 1498.

The AP 1410 may control a plurality of hardware or software elements connected thereto by driving an operating system or an application program, process various types of data including multimedia data, and perform calculations. The AP 1410 may be embodied as, for example, a system on chip (SoC). According to an embodiment, the AP 1410 may further include a graphic processing unit (GPU) (not illustrated).

The communication module 1420 (e.g., the communication interface 160) may perform data transmission/reception in communication between the electronic device 1401 (e.g., the electronic device 100) and other electronic devices (e.g., the electronic device 104 and the server 106) connected over a network. According to an embodiment, the communication module 1420 may include a cellular module 1421, a WiFi module 1423, a Bluetooth (BT) module 1425, a global positioning system (GPS) module 1427, a near field communication (NFC) module 1428, and a radio frequency (RF) module 1429.

The cellular module 1421 may provide a voice call, a video call, a text message service, an Internet service, or the like through a communication network (e.g., LTE, LTE-A, CDMA, WCDMA, UMTS, WiBro, GSM, or the like). Also, the cellular module 1421 may identify and authenticate an electronic device in a communication network using, for example, a subscriber identification module (e.g., the SIM card 1424). According to an embodiment, the cellular module 1421 may perform at least some of functions that the AP 1410 may provide. For example, the cellular module 1421 may perform at least a part of the multimedia control function.

According to an embodiment, the cellular module 1421 may include a communication processor (CP). Furthermore, the cellular module 1421 may be embodied as, for example, an SoC. Although the elements such as the cellular module 1421 (e.g., the communication processor), the memory 1430, the power management module 1495, and the like are illustrated to be separate from the AP 1410 in FIG. 14, the AP 1410 may be embodied to include at least some of the above described elements (e.g., the cellular module 1421) according to one embodiment.

According to an embodiment, the AP 1410 or the cellular module 1421 (e.g., communication processor) may load, to a volatile memory, a command or data received from at least one of a non-volatile memory and other elements connected to each of the AP 1010 and the cellular module 1021 and process the loaded command or data. Furthermore, the AP 1410 or the cellular module 1421 may store, in a non-volatile memory, data received from, or generated by, at least one of the other elements.

The Wi-Fi module 1423, the BT module 1425, the GPS module 1427, and the NFC module 1428 may include, for example, a processor for processing data transmitted/received through a corresponding module. Although the cellular module 1421, the Wi-Fi module 1423, the BT module 1425, the GPS module 1427, and the NFC module 1428 are illustrated as individual blocks in FIG. 14, at least some (e.g., two or more) of the cellular module 1421, the Wi-Fi module 1423, the BT module 1425, the GPS module 1427, and the NFC module 1428 may be included within one Integrated Chip (IC) or one IC package. For example, at least some of processors corresponding to the cellular module 1421, the Wi-Fi module 1423, the BT module 1425, the GPS module 1427, and the NFC module 1428 respectively (for example, a CP corresponding to the cellular module 1421 and a Wi-Fi processor corresponding to the WiFi module 1423) may be embodied as a single SoC.

The RF module 1429 may transmit/receive data, for example, an RF signal. Although not illustrated, the RF module 1429 may include, for example, a transceiver, a power amp module (PAM), a frequency filter, a low noise amplifier (LNA) or the like. Also, the RF module 1429 may further include components, for example, a conductor or a cable for transmitting and receiving electromagnetic waves through a free space in wireless communication. Although the cellular module 1421, the Wifi module 1423, the BT module 1425, the GPS module 1427, and the NFC module 1428 are illustrated to share one RF module 1429 in FIG. 14, at least one of the cellular module 1421, the Wi-Fi module 1423, the BT module 1425, the GPS module 1427, and the NFC module 1428 may transmit/receive an RF signal through a separate RF module.

The SIM card 1424 may be a card including a subscriber identification module, and may be inserted into a slot formed in a predetermined portion of the electronic device. The SIM card 1424 may include unique identification information (e.g., an integrated circuit card identifier (ICCID)) or subscriber information (e.g., an international mobile subscriber identity (IMSI)).

The memory 1430 (e.g., the memory 1430) may include an embedded memory 1432 or an external memory 1434. The embedded memory 1432 may include, for example, at least one of a volatile memory (e.g., a dynamic random access memory (DRAM), a static RAM (SRAM), a synchronous dynamic RAM (SDRAM), and the like) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, and the like).

According to an embodiment, the embedded memory 1432 may be a solid state drive (SSD). The external memory 1434 may further include a flash drive, for example, a compact flash (CF), a secure digital (SD), a micro secure digital (Micro-SD), a mini secure digital (Mini-SD), an extreme digital (xD), a memory stick, or the like. The external memory 1434 may be functionally connected to the electronic device 1401 through various interfaces. According to an embodiment, the electronic device 1401 may further include a storage device (or storage medium) such as a hard drive.

The sensor module 1440 may measure a physical quantity or detect an operating state of the electronic device 1401, and may convert the measured or detected information into an electrical signal. The sensor module 1440 may include at least one of, for example, a gesture sensor 1440A, a gyro sensor 1440B, an atmospheric pressure sensor 1440C, a magnetic sensor 1440D, an acceleration sensor 1440E, a grip sensor 1440F, a proximity sensor 1440G, a color sensor 1440H (e.g., a red/green/blue (RGB) sensor), a biometric sensor 1440I, a temperature/humidity sensor 1440J, an illumination sensor 1440K, and an ultra violet (UV) sensor 1440M. Additionally or alternatively, the sensor module 1440 may include, for example, an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor, an iris sensor (not illustrated), a fingerprint sensor, and the like. The sensor module 1440 may further include a control circuit for controlling at least one sensor included in the sensor module 1040.

The input device 1450 may include a touch panel 1452, a (digital) pen sensor 1454, a key 1456, or an ultrasonic input device 1458. The touch panel 1452 may recognize a touch input through at least one of, for example, a capacitive type, a resistive type, an infrared type, and an ultrasonic type. Also, the touch panel 1452 may further include a control circuit. In the case of the capacitive type, physical contact or proximity recognition is possible. The touch panel 1452 may further include a tactile layer. In this case, the touch panel 1452 may provide a tactile reaction to a user.

The (digital) pen sensor 1454 may be implemented, for example, using a method that is the same as or similar to receiving a user's touch input, or using a separate recognition sheet. The key 1456 may include, for example, a physical button, an optical key, or a keypad. The ultrasonic input device 1458 is a device that may determine data by detecting an ultrasonic wave generated by an input tool, through a microphone (e.g., a microphone 1488) in the electronic device 1401, and is capable of wireless recognition. According to an embodiment, the electronic device 1401 may also receive a user input from an external device (e.g., a computer or server) connected thereto, using the communication module 1420.

The display 1460 (e.g., the display 1450) may include a panel 1462, a hologram device 1464, or a projector 1466. The panel 1462 may be, for example, a liquid crystal display (LCD), an active matrix organic light emitting diode (AMOLED), or the like. The panel 1462 may be embodied to be, for example, flexible, transparent, or wearable. The panel 1462 may also be integrated with the touch panel 1452 as a single module. The hologram device 1464 may show a stereoscopic image in the air by using interference of light. The projector 1466 may project light onto a screen to display an image. For example, the screen may be located inside or outside the electronic device 1401. According to an embodiment, the display 1460 may further include a control circuit for controlling the panel 1462, the hologram device 1464, or the projector 1466.

The interface 1470 may include, for example, a high-definition multimedia interface (HDMI) 1472, a universal serial bus (USB) 1474, an optical interface 1476, or a D-subminiature (D-sub) 1478. The interface 1470 may be included in, for example, the communication interface 160 illustrated in FIG. 1. Additionally or alternatively, the interface 1470 may include, for example, a mobile high-definition link (MHL) interface, a secure digital (SD) card/multimedia card (MMC) interface, or an infrared data association (IrDA) standard interface.

The audio module 1480 may bilaterally convert a sound and an electrical signal. At least some elements of the audio module 1480 may be included in, for example, the input/output interface 140 illustrated in FIG. 1. The audio module 1480 may process sound information input or output through, for example, a speaker 1482, a receiver 1484, earphones 1486, the microphone 1488, or the like.

The camera module 1491 is a device which may photograph a still image and a video. According to an embodiment, the camera module 1491 may include one or more image sensors (e.g., a front sensor or a rear sensor), a lens (not illustrated), an image signal processor (ISP) (not illustrated) or a flash (not illustrated) (e.g., an LED or xenon lamp).

The power management module 1495 may manage power of the electronic device 1401. Although not illustrated, the power management module 1495 may include, for example, a power management integrated circuit (PMIC), a charger integrated circuit (IC), or a battery or fuel gauge.

The PMIC may be mounted, for example, in integrated circuits or SoC semiconductors. The charging methods may be classified into wired charging and wireless charging. The charger IC may charge a battery and prevent inflow of excessive voltage or excessive current from a charger. According to an embodiment, the charger IC may include a charger IC for at least one of the wired charging method and the wireless charging method. Examples of the wireless charging may include magnetic resonance charging, magnetic induction charging, electromagnetic charging, or the like, and an additional circuit, for example, a coil loop, a resonance circuit, a rectifier, or the like may be added for the wireless charging.

The battery gauge may measure, for example, a residual quantity of the battery 1496 or a voltage, current, or temperature during charging. The battery 1496 may store or generate electricity and supply power to the electronic device 1401 using the stored or generated electricity. The battery 1496 may include, for example, a rechargeable battery or a solar battery.

The indicator 1497 may indicate particular states (e.g., a booting state, a message state, a charging state, or the like) of the electronic device 1401 or a part (e.g., the AP 1410) of the electronic device. The motor 1498 may convert an electrical signal into a mechanical vibration. Although not illustrated, the electronic device 1401 may include a processing device (e.g., a GPU) for supporting a mobile TV. The processing device for supporting the mobile TV may process media data according to standards, for example, a digital multimedia broadcasting (DMB), a digital video broadcasting (DVB), a media flow, or the like.

The above described components of the electronic device according to various embodiments of the present disclosure may be formed of one or more components, and a name of a corresponding component element may be changed based on the type of electronic device. The electronic device according to the present disclosure may include one or more of the aforementioned components or may further include other additional components, or some of the aforementioned components may be omitted. Further, some of the components of the electronic device according to the various embodiments of the present disclosure may be combined to form a single entity, and thus, may equivalently execute functions of the corresponding elements prior to the combination.

The "module" used in various embodiments of the present disclosure may refer to, for example, a "unit" including one of hardware, software, and firmware, or a combination of two or more of the hardware, software, and firmware. The "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to various embodiments of the present disclosure may include at least one of an Application-Specific Integrated Circuit (ASIC) chip, a Field-Programmable Gate Arrays (FPGAs), and a programmable-logic device for performing operations which have been known or are to be developed hereafter.

According to various embodiments, at least a part of a device (for example, modules or functions thereof) or a method (for example, operations) according to the various embodiments of the present disclosure may be embodied by, for example, a command stored in a computer readable storage medium in a form of a programming module. When the command is executed by one or more processors (for example, the processor 122), the one or more processors may execute a function corresponding to the command. The computer-readable storage medium may be, for example, the memory 130. At least a part of the programming module may, for example, be implemented (e.g., executed) by the processor 210. At least a part of the programming module may, for example, include a module, a program, a routine, a set of instructions, or a process for performing at least one function.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments, there is provided a storage medium storing commands, and the commands are set to enable at least one processor to execute at least one operation when the commands are executed by the at least one processor. The at least one operation, in association with a biometric recognizing method of the electronic device, may include: sensing the orientation of the electronic device; recognizing biometric information using a parameter corresponding to the sensed orientation; and mapping information associated with the sensed orientation of the electronic device and the recognized biometric information, and storing the same.

Embodiments of the present disclosure provided in the present specifications and drawings are merely certain examples to readily describe the technology associated with embodiments of the present disclosure and to help understanding of the embodiments of the present disclosure, but may not limit the scope of the embodiments of the present disclosure. Therefore, in addition to the embodiments disclosed herein, the scope of the various embodiments of the present disclosure should be construed to include all modifications or modified forms drawn based on the technical idea of the various embodiments of the present disclosure.

What is claimed is:

1. A method of recognizing biometric information on at least part of a user's face by an electronic device, the method comprising:
    storing first biometric information on at least part of the user's face for each of at least two direction of the electronic device;
    displaying a screen that requests second biometric information on at least part of the user's face;
    obtaining the second biometric information on at least part of the user's face via an image sensor in response to displaying the screen that requests the second biometric information; and
    performing authentication for the user based on a comparison of the obtained second biometric information and the stored first biometric information, wherein the performing of the authentication further comprises identifying an orientation of the electronic device recognized when the second biometric information is obtained, and reading out the first biometric information corresponding to the recognized orientation.

2. The method as claimed in claim 1, wherein the at least two direction includes horizontal direction and vertical direction.

3. The method as claimed in claim 1, further comprising:
    performing the authentication using a parameter corresponding to the orientation of the electronic device, the parameter being related to an infrared light emission or the image sensor.

4. The method as claimed in claim 1, wherein the stored first biometric information corresponds to a plurality of directions of the electronic device, and the obtained second biometric information corresponds to a single direction of the electronic device.

5. The method as claimed in claim 1, wherein the stored first biometric information corresponds to the orientation of the electronic device, and the obtained second biometric information corresponds to another orientation of the electronic device.

6. The method as claimed in claim 1, wherein the stored first biometric information and the obtained second biometric information correspond to same direction of the electronic device, respectively.

7. The method as claimed in claim 3, further comprising:
    controlling the parameter, wherein the parameter includes at least one of a length, an intensity, and a period of a infrared light emission pulse, and a sensitivity of the image sensor.

8. The method as claimed in claim 7, wherein, when the orientation of the electronic device is a horizontal direction, the controlling of the parameter comprises at least one out of:
    controlling the length of the infrared light emission pulse corresponding to the horizontal direction to be longer than the length of the infrared light emission pulse corresponding to a vertical direction; and
    controlling the intensity of the infrared light emission pulse corresponding to the horizontal direction to be lower than the intensity of the infrared light emission pulse corresponding to the vertical direction.

9. The method as claimed in claim 7, wherein, when the orientation of the electronic device is a horizontal direction, the controlling of the parameter comprises:
    controlling the sensitivity of the image sensor corresponding to the horizontal direction to be higher than the sensitivity of the image sensor corresponding to a vertical direction.

10. The method as claimed in claim 7, wherein, when the orientation of the electronic device is a vertical direction, the controlling of the parameter comprises at least one out of:
    controlling the length of the infrared light emission pulse corresponding to the vertical direction to be shorter than the length of the infrared light emission pulse corresponding to a horizontal direction; and
    controlling the intensity of the infrared light emission pulse corresponding to the vertical direction to be higher than the intensity of the infrared light emission pulse corresponding to the horizontal direction.

11. The method as claimed in claim 7, wherein, when the orientation of the electronic device is a vertical direction, the controlling of the parameter comprises:
    controlling the sensitivity of the image sensor corresponding to the vertical direction to be lower than the sensitivity of the image sensor corresponding to a horizontal direction.

12. The method as claimed in claim 1, further comprising:
mapping information associated with each direction of the electronic device and the first biometric information for each direction, and storing the information.

13. The method as claimed in claim 1, the performing authentication for the user further comprises:
recognizing the second biometric information through the displayed screen;
and
executing a function based on the comparison between the obtained second biometric information and the read first biometric information.

14. The method as claimed in claim 1, wherein, when a recognition rate with respect to the obtained second biometric information is less than or equal to a threshold value, the method further comprises:
outputting a message that requests changing the orientation of the electronic device;
re-recognizing the second biometric information on at least part of the user's face in the changed orientation; and
combining the recognized second biometric information and the re-recognized second biometric information, and storing the combined information.

15. The method as claimed in claim 14, wherein the recognition rate is a ratio of an area that the electronic device is capable of recognizing from a photographed face to an entire area of recognized second biometric information.

16. An electronic device that recognizes biometric information on at least part of a user's face, the electronic device comprising:
a memory;
a display; and
a processor configured to:
control the memory to store first biometric information on at least part of the user's face for each of at least two direction of the electronic device;
control the display to display a screen that requests second biometric information on at least part of the user's face;
obtain the second biometric information on at least part of the user's face in response to displaying the screen that requests the second biometric information; and
perform authentication for the user based on a comparison of the obtained second biometric information and the stored first biometric information, wherein the performing of the authentication further comprises identifying an orientation of the electronic device recognized when the second biometric information is obtained, and reading out the first biometric information corresponding to the recognized orientation.

17. The electronic device as claimed in claim 16, wherein at least two direction includes horizontal direction and vertical direction.

18. The electronic device as claimed in claim 16, wherein the processor further configured to:
perform the authentication using a parameter corresponding to the orientation of the electronic device, the parameter being related to an infrared light emission or an image sensor.

19. The electronic device as claimed in claim 16, wherein the stored first biometric information corresponds to a plurality of directions of the electronic device, and the obtained second biometric information corresponds to a single direction of the electronic device.

20. The electronic device as claimed in claim 16, wherein the stored first biometric information corresponds to the orientation of the electronic device, and the obtained second biometric information corresponds to another orientation of the electronic device.

21. The method of claim 1, wherein storing first biometric information comprises storing first biometric information for each of at least two directions of the electronic device.

* * * * *